(12) United States Patent
Yamaguchi et al.

(10) Patent No.: US 12,212,094 B2
(45) Date of Patent: Jan. 28, 2025

(54) CONNECTOR

(71) Applicant: Yazaki Corporation, Tokyo (JP)

(72) Inventors: Yasuhiro Yamaguchi, Kakegawa (JP);
Hideki Mizuno, Kakegawa (JP);
Hiroshi Fujita, Kakegawa (JP);
Toshiharu Takahashi, Kakegawa (JP);
Hiroyuki Tanaka, Kakegawa (JP);
Kazuki Shirosaka, Kakegawa (JP);
Takanori Kanamori, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 351 days.

(21) Appl. No.: 17/844,890

(22) Filed: Jun. 21, 2022

(65) Prior Publication Data

US 2022/0416471 A1 Dec. 29, 2022

(30) Foreign Application Priority Data

Jun. 23, 2021 (JP) .................... 2021-104456
Jan. 12, 2022 (JP) .................... 2022-003289

(51) Int. Cl.
| | | |
|---|---|---|
| *H01R 13/52* | (2006.01) | |
| *B60L 53/16* | (2019.01) | |
| *H01R 13/512* | (2006.01) | |
| *H01R 4/18* | (2006.01) | |
| *H01R 24/20* | (2011.01) | |
| *H01R 103/00* | (2006.01) | |

(52) U.S. Cl.
CPC .......... *H01R 13/5202* (2013.01); *B60L 53/16* (2019.02); *H01R 13/512* (2013.01); *H01R 4/18* (2013.01); *H01R 24/20* (2013.01); *H01R 2103/00* (2013.01); *H01R 2201/26* (2013.01)

(58) Field of Classification Search
CPC .... H01R 13/5202; H01R 13/512; H01R 4/18; H01R 24/20; H01R 2103/00; H01R 2201/26; H01R 13/506; H01R 13/5205; H01R 13/533; H01R 13/02; B60L 53/16; Y02E 60/14; Y02T 10/70; Y02T 10/7072; Y02T 90/14; H05K 7/2039
USPC ........................................................ 439/634
See application file for complete search history.

(56) References Cited

U.S. PATENT DOCUMENTS

| | | | | |
|---|---|---|---|---|
| 5,862,855 | A * | 1/1999 | Balk ............ | C09K 5/16 62/480 |
| 8,587,945 | B1 * | 11/2013 | Hartmann ...... | H01L 23/42 361/720 |
| 10,675,988 | B2 * | 6/2020 | Fuehrer ......... | B60L 53/16 |
| 10,756,498 | B1 * | 8/2020 | Sarraf ........... | B60L 53/302 |
| 11,285,832 | B2 * | 3/2022 | Rhodes .......... | B60L 53/11 |

(Continued)

FOREIGN PATENT DOCUMENTS

| | | |
|---|---|---|
| CN | 207082683 U | 3/2018 |
| DE | 10 2016 105 361 A1 | 9/2017 |

(Continued)

*Primary Examiner* — Alexander Gilman
(74) *Attorney, Agent, or Firm* — Sughrue Mion, PLLC

(57) ABSTRACT

A connector includes: an electric wire; a terminal connected to the electric wire; a housing having a housing space to house a connection portion of the electric wire and the terminal; a seal member to seal an opening portion of the housing space to isolate the connection portion housed in the housing space from an outside; and a heat storage member located in the housing space.

14 Claims, 27 Drawing Sheets

(56) References Cited

U.S. PATENT DOCUMENTS

| | | | |
|---|---|---|---|
| 11,469,531 B2* | 10/2022 | Cole | B60L 53/11 |
| 11,973,288 B1* | 4/2024 | Palombini | F28F 9/26 |
| 2016/0308262 A1* | 10/2016 | Masias | H01M 10/486 |
| 2019/0176653 A1* | 6/2019 | Fuehrer | B60L 53/16 |
| 2019/0296657 A1* | 9/2019 | Chung | H02M 7/003 |
| 2019/0334293 A1 | 10/2019 | Iwami et al. | |
| 2019/0364695 A1* | 11/2019 | Lee | H05K 7/20336 |
| 2020/0067237 A1* | 2/2020 | Sarraf | H01R 13/6683 |
| 2020/0307400 A1* | 10/2020 | de Chazal | B60L 53/16 |
| 2020/0384875 A1* | 12/2020 | Rhodes | B60L 53/16 |
| 2021/0057845 A1* | 2/2021 | Minamino | H01R 13/5208 |
| 2021/0063097 A1* | 3/2021 | Hitchcock | B60L 53/16 |
| 2021/0151932 A1* | 5/2021 | Masuda | H01R 13/533 |
| 2022/0069508 A1* | 3/2022 | Hashimoto | H02J 7/00 |
| 2022/0131304 A1* | 4/2022 | Hashimoto | H01R 13/502 |
| 2022/0216654 A1* | 7/2022 | Hashimoto | B60L 53/16 |
| 2024/0195121 A1* | 6/2024 | Yamaguchi | H01R 13/521 |

FOREIGN PATENT DOCUMENTS

| | | |
|---|---|---|
| JP | 2019-192482 A | 10/2019 |
| JP | 2020-113449 A | 7/2020 |
| JP | 2020-187920 A | 11/2020 |
| WO | 2020/145118 A1 | 7/2020 |

\* cited by examiner

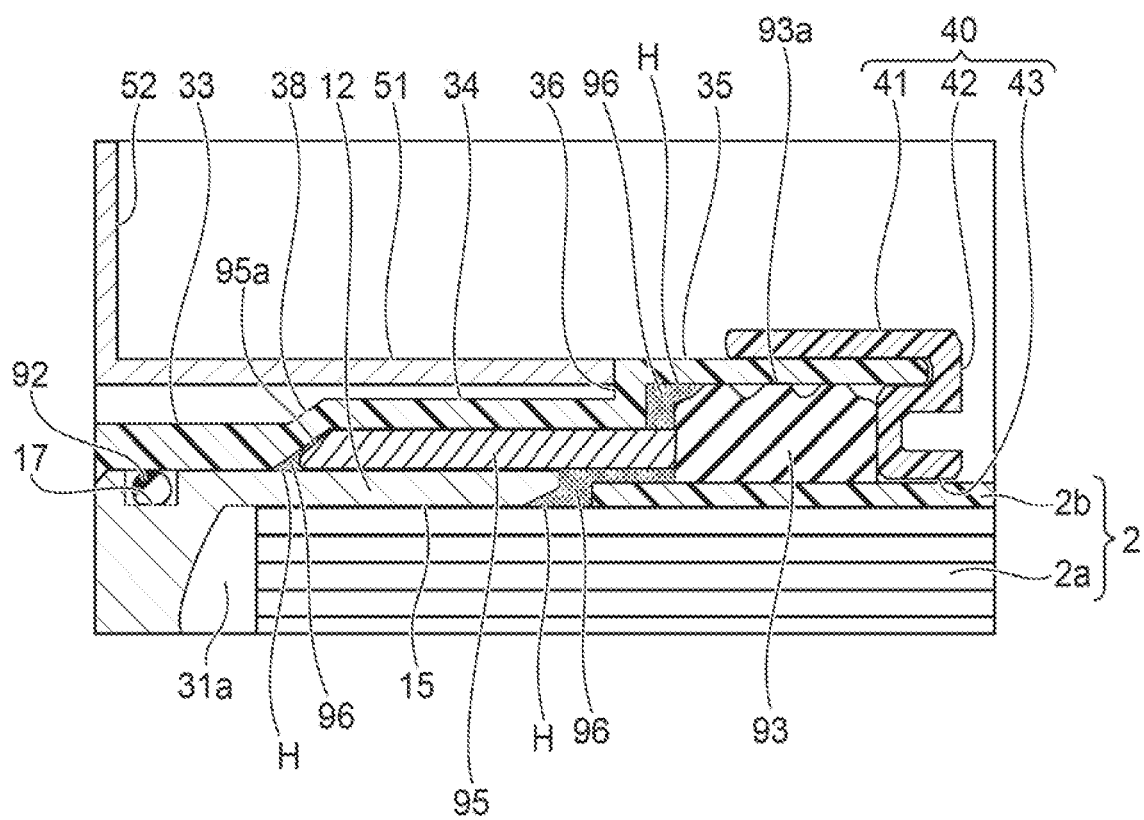
FIG. 7
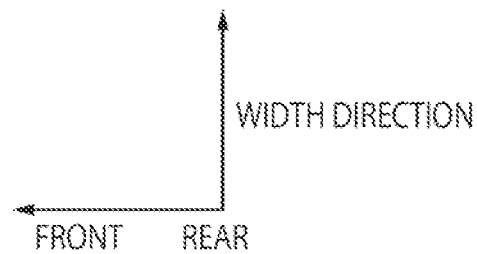

CONNECTOR

CROSS-REFERENCE TO RELATED APPLICATIONS

This application is based on and claims priority under 35 USC 119 from Japanese Patent Application No. 2021-104456 filed on Jun. 23, 2021 and Japanese Patent Application No. 2022-003289 filed on Jan. 12, 2022, and the contents of which are incorporated herein by reference.

TECHNICAL FIELD

The present invention relates to a connector including an electric wire, a terminal, a housing that houses a connection portion between the electric wire and the terminal, a seal member that seals an opening portion of a housing space, and a heat storage member disposed in the housing space.

BACKGROUND ART

In the related art, a charging connector provided in a vehicle has been proposed in order to supply (charge) electric power from an outside of the vehicle to a battery mounted in the vehicle such as an electric vehicle or a plug-in hybrid vehicle (see, for example, Patent Literature 1). This type of connector is also generally referred to as a charging inlet.

As for details of the above connector, refer to JP 2019-192482 A.

The above-described type of the connector (charging inlet) is generally required to have a structure and characteristics defined by various standards. For example, when the connector described above is actually used, a temperature of the terminal (so-called operating temperature) increases due to Joule heat generated in the terminal at a time of energization. Therefore, from a viewpoint of quality maintenance, safety, and the like of the connector, an upper limit value of the operating temperature of the terminal and the like are defined by a predetermined standard.

However, in the above-described connector in the related art, the connection portion between the terminal and the electric wire is a portion at which an amount of heat generation is large due to a magnitude of a contact resistance, and the connection portion is sealed with a packing or the like and isolated from an outside from a viewpoint of waterproofing or the like. Furthermore, air in such an isolated space also acts as a heat insulating material. Therefore, it is considered that it is extremely difficult to dissipate heat from the connection portion between the terminal and the electric wire to the outside. In addition, for example, in a case of fast battery charging, since a large current passes through the connector in a short time, a degree of temperature rise of the terminal (in particular, the connection portion described above) per unit time is higher than that in a case of normal charging. For this reason, in the connector of the related art, it may be difficult to keep the operating temperature of the terminal within a range defined by the standard only by natural heat dissipation.

On the other hand, easily assembling a heat dissipation member (for example, a metal plate or the like) to the outside of the connector is not desirable because miniaturization of the connector is hindered and an installation space of the connector in a vehicle body is limited.

SUMMARY OF INVENTION

Aspect of non-limiting embodiments of the present disclosure relates to provide a connector capable of preventing an excessive rise in an operating temperature of a terminal while avoiding an increase in a size of the connector.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a connector comprising:
an electric wire;
a terminal connected to the electric wire;
a housing having a housing space to house a connection portion of the electric wire and the terminal;
a seal member to seal an opening portion of the housing space to isolate the connection portion housed in the housing space from an outside; and
a heat storage member located in the housing space.

BRIEF DESCRIPTION OF DRAWINGS

Exemplary embodiment(s) of the present invention will be described in detail based on the following figures, wherein:

FIG. 7 is an enlarged view of a portion B in FIG. 6.

DESCRIPTION OF EMBODIMENTS

First Embodiment

Hereinafter, a connector 1 according to a first embodiment of the present invention will be described with reference to the drawings. The connector 1 is a connector that is installed in a vehicle such as a plug-in hybrid vehicle or an electric vehicle and is connected to an electric wire extending from a battery mounted on the vehicle. The connector 1 is also referred to as a charging inlet. By fitting a counterpart connector (a so-called charging gun) into a fitting recess 63 (see FIG. 1 and the like) of the connector 1, electric power is supplied to the battery from an outside of the vehicle to charge the battery.

Figure 1:
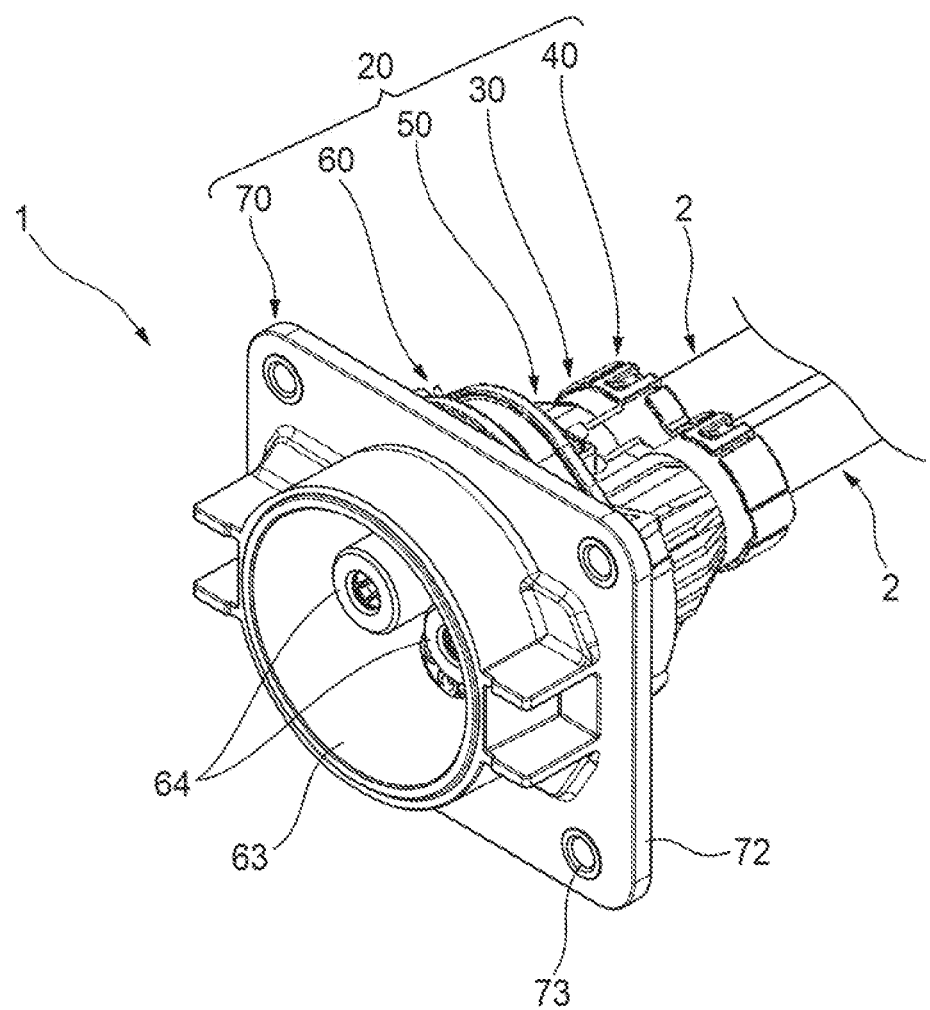
FIG. 1 is a perspective view showing a state in which a connector according to a first embodiment of the present invention is connected to electric wires.
Figure 1:
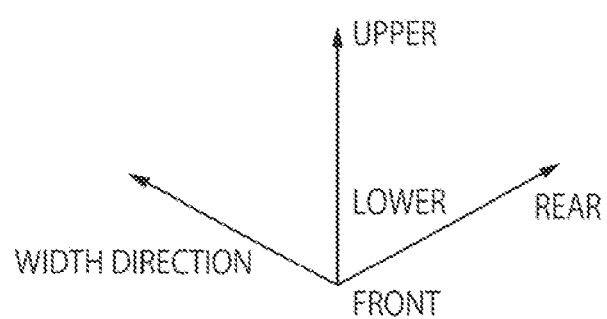
Figure 2:
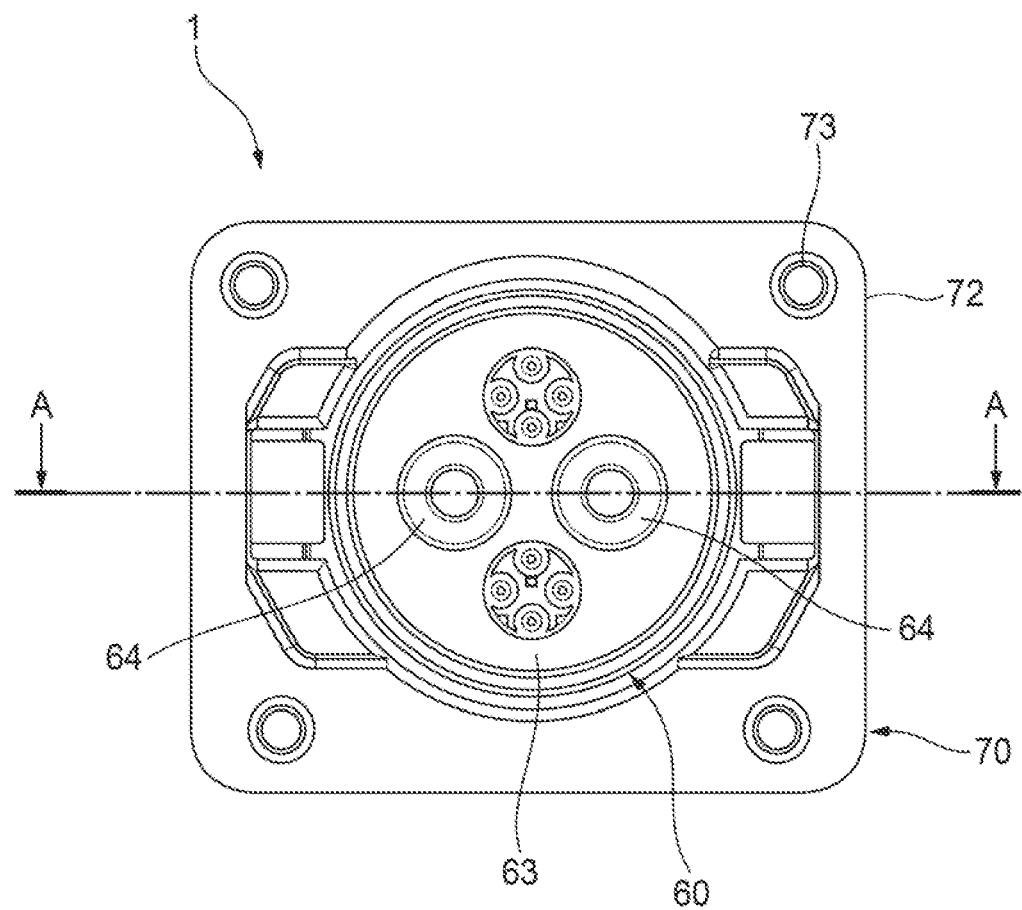
FIG. 2 is a front view of the connector shown in FIG. 1.
Figure 2:
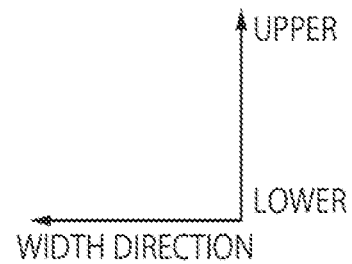

Hereinafter, for convenience of description, a "front-rear direction", a "width direction", an "upper-lower direction", "upper", "lower", "front", and "rear" are defined as shown in FIG. 1 and the like. The "front-rear direction", the "width direction", and the "upper-lower direction" are orthogonal to one another. The front-rear direction coincides with a fitting direction of the connector 1 and the counterpart connector (not shown), and a front side (a side approaching the counterpart connector) in the fitting direction as viewed from the connector 1 is referred to as a "front side", and a release side (a side away from the counterpart connector) in the fitting direction as viewed from the connector 1 is referred to as a "rear side".

Figure 6:
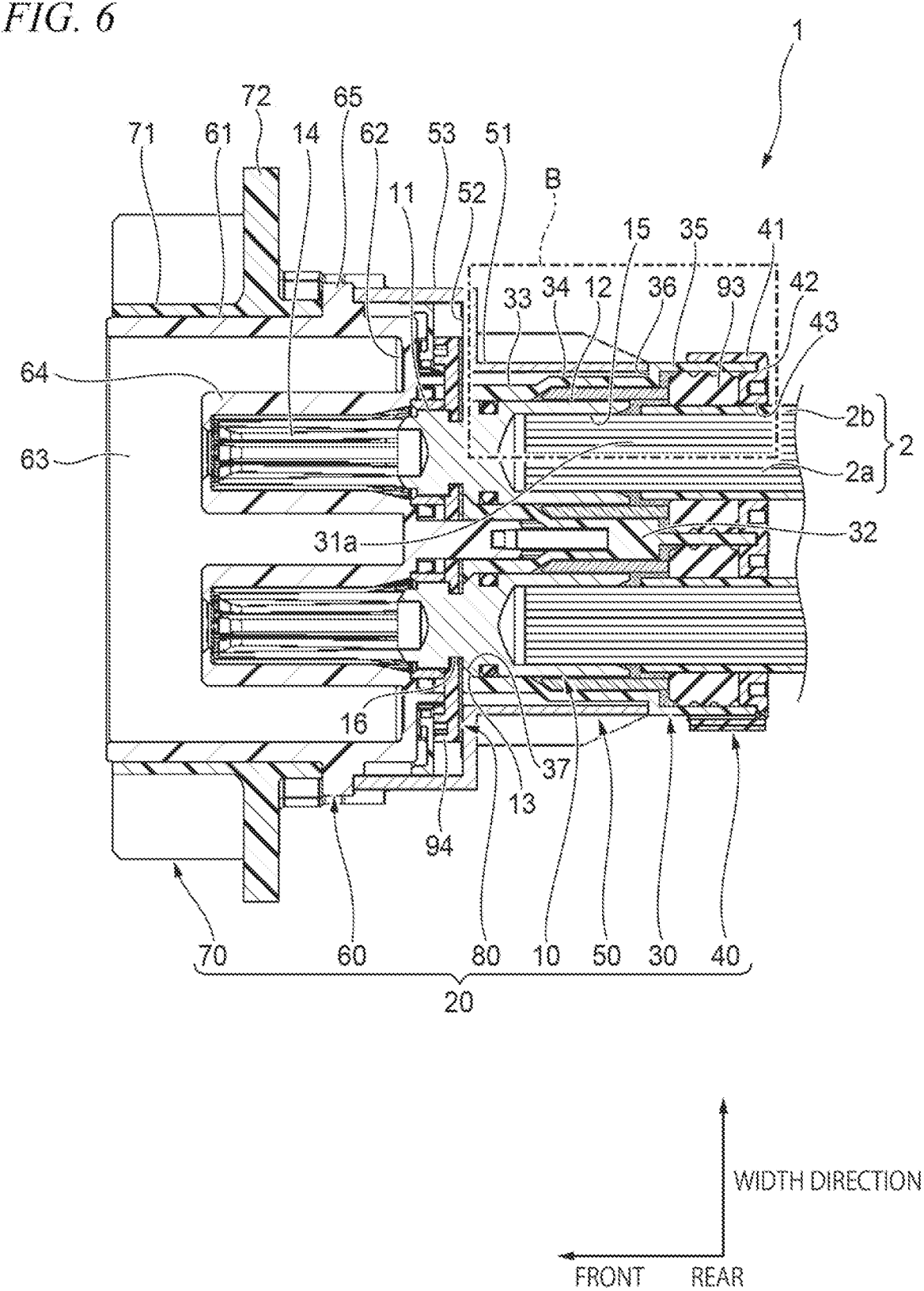
FIG. 6 is a cross-sectional view taken along a line A-A of FIG. 2.

As shown in FIGS. 1, 6, and the like, the connector 1 includes a pair of terminals 10 and a housing 20 in which the pair of terminals 10 are stored. One end portions of a pair of electric wires 2 are connected to the pair of terminals 10, respectively. The other end portions of the pair of electric wires 2 are connected to the battery (not shown). Each of the electric wires 2 includes a conductor core wire 2a and a coating 2b made of an insulating resin and covering the conductor core wire 2a (see FIG. 6). Hereinafter, each component constituting the connector 1 will be described in order.

Figure 5:
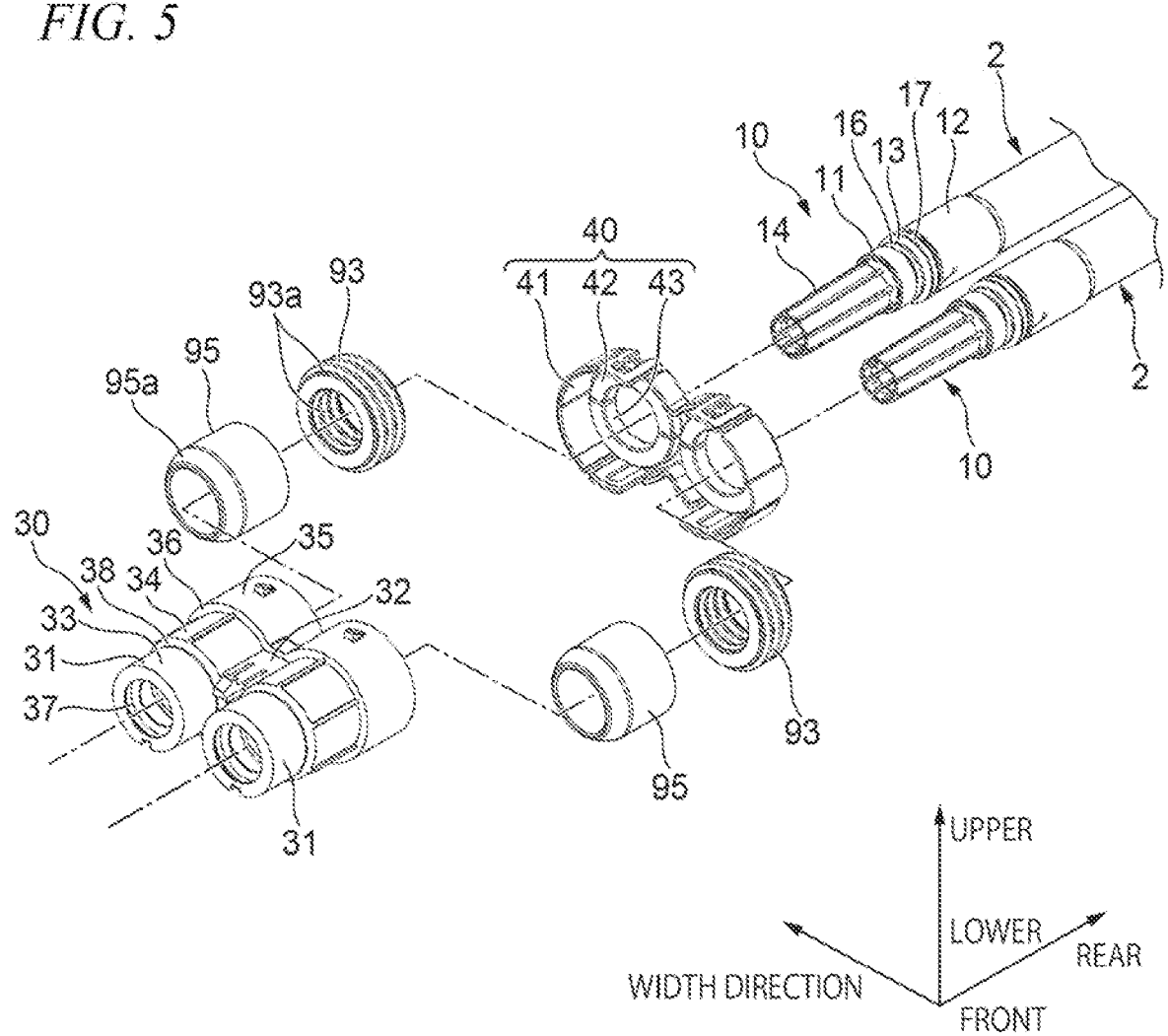
FIG. 5 is a perspective view showing a state in which the assembly shown in FIG. 4 is disassembled.

First, the pair of terminals 10 will be described. In the first embodiment, the pair of terminals 10 have the same shape. Each of the terminals 10 is made of metal and, as shown in FIGS. 5 and 6, includes a stepped columnar portion including a small diameter portion 11 and a large diameter portion 12 located on the rear side of the small diameter portion 11. An annular step portion 13 is formed at a boundary portion between the small diameter portion 11 and the large diameter portion 12. The step portion 13 is locked to a locking protrusion 37 (see FIG. 6) of a base holder 30 to be described later.

The small diameter portion 11 is integrally provided with a cylindrical female terminal portion 14 protruding forward from a front end surface of the small diameter portion 11. Among the pair of terminals 10, the female terminal portion 14 of one terminal 10 functions as an anode side terminal, and the female terminal portion 14 of the other terminal 10 functions as a cathode side terminal. When the connector 1 and the counterpart connector are fitted to each other, the female terminal portion 14 of one terminal 10 and the female terminal portion 14 of the other terminal 10 are respectively connected to an anode side male terminal portion and a cathode side male terminal portion of the counterpart connector.

A recess 15 recessed forward is formed in a rear end surface of the large diameter portion 12 (see FIGS. 6 and 7). The conductor core wire 2a exposed at one end portion of the electric wire 2 is inserted into the recess 15 and crimped and fixed. Accordingly, the terminal 10 and one end portion of the electric wire 2 are electrically connected to each other. The large diameter portion 12 of the terminal 10 and the conductor core wire 2a of the electric wire 2 constitute a "connection portion" between the electric wire 2 and the terminal 10.

As shown in FIG. 6, an annular groove 16 is formed on an outer peripheral surface of the small diameter portion 11 in the vicinity of the step portion 13, and an annular groove 17 (see FIG. 7) is formed on an outer peripheral surface of the large diameter portion 12 in the vicinity of the step portion 13. A heat transfer sheet 80 and a lock piece 94 (see FIG. 6) to be described later are mounted in the annular groove 16, and an O-ring 92 (see FIGS. 6 and 7) to be described later is mounted in the annular groove 17. The pair of terminals 10 have been described above.

Next, the housing 20 will be described. In the first embodiment, as shown in FIGS. 1 to 6, the housing 20 includes the base holder 30, a rear holder 40, a heat sink 50, an inner housing body 60, and an outer housing body 70. Each of the base holder 30, the rear holder 40, the heat sink 50, the inner housing body 60, and the outer housing body 70 is a frame component of the housing 20, and constitutes a part of an outer surface of the housing 20. Hereinafter, the components constituting the housing 20 will be described in order. The "frame component" of the housing 20 refers to, for example, a component having sufficient hardness and a strength in order to maintain a shape of the housing 20 itself so as to hold a position of the terminal 10 against an external force applied to the terminal 10 when the terminal 10 and a counterpart terminal (not shown) are fitted to each other. In other words, the "frame component" refers to a component made of a material that does not cause softening, embrittlement, or the like to an extent at which it is difficult to maintain the shape due to an increase in an operating temperature of the terminal 10.

First, the base holder 30 will be described. The base holder 30 has a function of holding the pair of terminals 10 in a state in which the terminals 10 are spaced apart from each other in the width direction and insulated from each other. The base holder 30 is a resin molded product, and integrally includes, as shown in FIG. 5, a pair of terminal holding portions 31 arranged in the width direction and a coupling portion 32 coupling the pair of terminal holding portions 31 in the width direction.

As shown in FIGS. 5 and 6, each of the terminal holding portions 31 has a stepped cylindrical shape extending in the front-rear direction including a small diameter portion 33, a medium diameter portion 34 positioned on a rear side of the small diameter portion 33, and a large diameter portion 35 positioned on a rear side of the medium diameter portion 34. The coupling portion 32 couples the medium diameter portions 34 and the large diameter portions 35 of the pair of terminal holding portions 31. The pair of terminals 10 are inserted into internal spaces 31a (see FIGS. 6 and 7) of the pair of terminal holding portions 31 from the rear side.

An annular step portion 36 is formed at a boundary portion between the medium diameter portion 34 and the large diameter portion 35, and an annular step portion 38 is formed at a boundary portion between the small diameter portion 33 and the medium diameter portion 34. A rear end surface of a tubular portion 51 of the heat sink 50 to be described later is locked to the step portion 36 (see FIGS. 6 and 7). The annular locking protrusion 37 is formed on an inner wall surface of a front end portion of the small diameter portion 33 so as to protrude inward in a radial direction of the small diameter portion 33 in correspondence with the step portion 13 of the terminal 10 (see FIG. 6).

Next, the rear holder 40 will be described. The rear holder 40 is assembled to the base holder 30 from the rear side, and has a function of holding the pair of electric wires 2 extending rearward from the pair of terminals 10 in a state of being spaced apart from each other in the width direction. The rear holder 40 is a resin molded product and as shown in FIG. 5, integrally includes tubular portions 41 extending in the front-rear direction and rear wall portions 42 closing rear openings of the tubular portions 41.

The tubular portions 41 has an outer peripheral shape corresponding to an outer peripheral shape formed by the pair of large diameter portions 35 and the coupling portion 32 of the base holder 30, and can be mounted to a rear end portion of the base holder 30 so as to cover outer peripheral surfaces of rear end portions of the pair of large diameter portions 35 and the coupling portion 32. The rear wall portion 42 is formed with, corresponding to the pair of large diameter portions 35, a pair of electric wire insertion holes 43 that are arranged in the width direction and penetrate in the front-rear direction. The pair of electric wires 2 are inserted into the pair of electric wire insertion holes 43 (see FIGS. 6 and 7).

Next, the heat sink 50 will be described. Among the plurality of components forming the frame component of the housing 20, only the heat sink 50 is made of metal. The heat sink 50 is assembled to the base holder 30 from the front side, and has a function of absorbing and dissipating heat generated in the pair of terminals 10. This point will be described in detail later.

Figure 3:
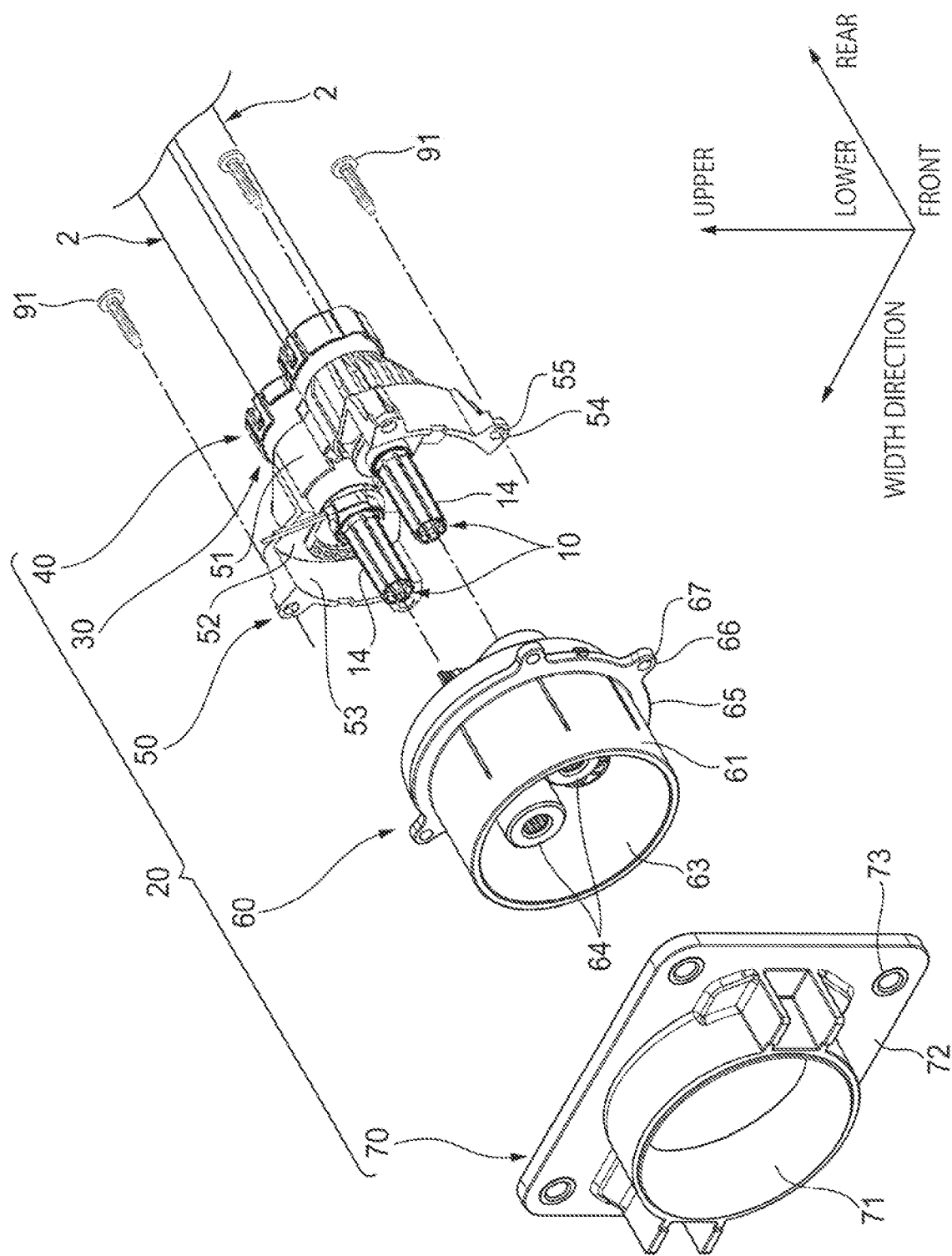
FIG. 3 is a perspective view showing a state in which some of a plurality of components constituting the connector shown in FIG. 1 are disassembled.
Figure 4:
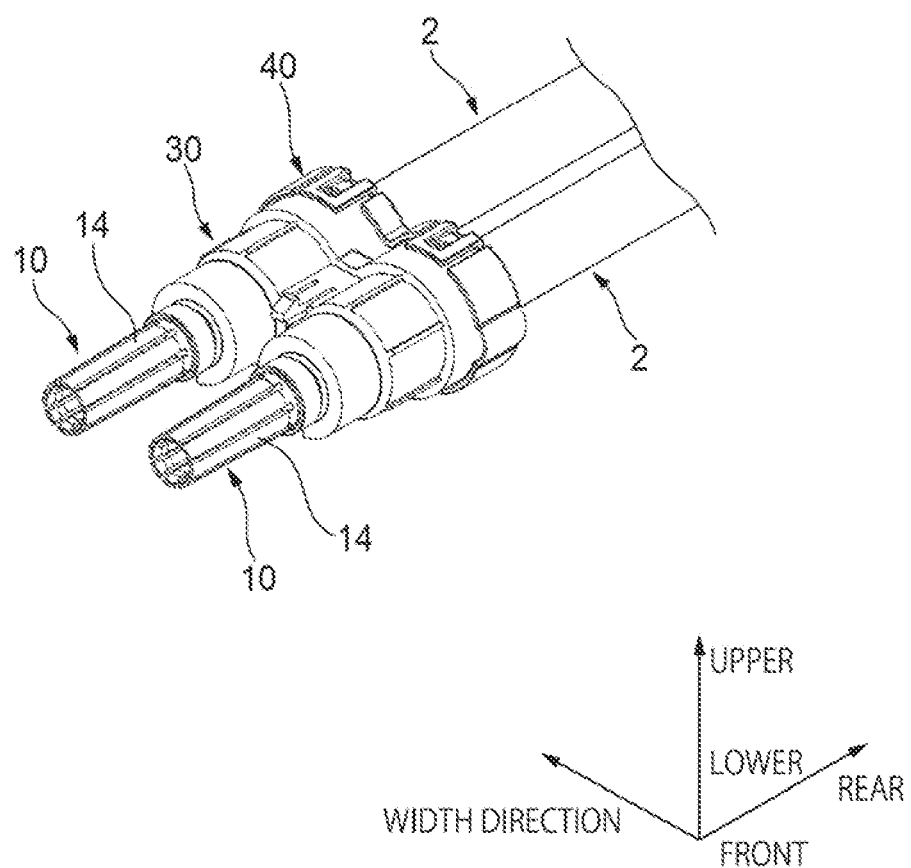
FIG. 4 is a perspective view showing an assembly in which a base holder and a rear holder are mounted on a pair of terminals to which a pair of electric wires are connected.

As shown in FIGS. 3 and 6, the heat sink 50 includes the tubular portion 51 extending in the front-rear direction. The tubular portion 51 has an outer peripheral shape corresponding to an outer peripheral shape formed by the pair of medium diameter portions 34 and the coupling portion 32 of the base holder 30, and can be mounted to the base holder 30 so as to cover outer peripheral surfaces of the pair of medium diameter portions 34 and the coupling portion 32.

A front end portion of the tubular portion 51 is integrally provided with a pair of extending portions 52 extending outward in the width direction from both side portions in the width direction of the front end portion of the tubular portion 51 and a pair of side wall portions 53 extending forward from extending end portions of the pair of extending portions 52. The pair of side wall portions 53 have a shape corresponding to a part of an outer peripheral shape (cylindrical shape) of a tubular portion 61 (see also FIG. 3) to be described later of the inner housing body 60 in a circumferential direction when viewed in the front-rear direction, and can be attached to the tubular portion 61 so as to cover an outer peripheral surface of a rear end portion of the tubular portion 61.

As shown in FIG. 3, bolt insertion portions 54 are provided at a plurality of positions (four positions in the first embodiment) on outer peripheral surfaces (outer side surfaces in the width direction) of the pair of side wall portions 53. A bolt insertion hole 55 penetrating in the front-rear direction is formed in each of the bolt insertion portions 54. Bolts 91 (see FIG. 3) for assembling the housing 20 are inserted into the bolt insertion holes 55.

Next, the inner housing body 60 will be described. The inner housing body 60 is assembled to the tubular portion 51 of the heat sink 50 from the front side, and has a function of forming the fitting recess 63 (see also FIG. 1) of the connector 1. The inner housing body 60 is a resin molded product and integrally includes the cylindrical tubular portion 61 extending in the front-rear direction and a rear wall portion 62 closing a rear opening of the tubular portion 61. The tubular portion 61 and the rear wall portion 62 define the fitting recess 63 that opens forward and is recessed rearward.

The rear wall portion 62 is provided with a pair of cylindrical female terminal housing portions 64 corresponding to the female terminal portions 14 of the pair of terminals 10 so as to protrude forward (see FIGS. 3 and 6). Each of the female terminal housing portions 64 is located in the fitting recess 63 and has an internal space penetrating in the front-rear direction.

As shown in FIG. 3, an annular flange portion 65 protruding outward in the radial direction of the tubular portion 61 is provided at a position on a rear side of a center of an outer peripheral surface of the tubular portion 61 in the front-rear direction. The flange portion 65 is provided with bolt insertion portions 66 at a plurality of positions (four positions in the first embodiment) in the circumferential direction corresponding to the plurality of bolt insertion portions 54 of the heat sink 50. A bolt insertion hole 67 penetrating in the front-rear direction is formed in each of the bolt insertion portions 66. The bolts 91 (see FIG. 3) for assembling the housing 20 are inserted into the bolt insertion holes 67.

Next, the outer housing body 70 will be described. The outer housing body 70 is assembled to the tubular portion 61 of the inner housing body 60 from the front side, and has a function of fixing the entire housing 20 to an attachment target portion (not shown) of the connector 1 provided in the vehicle. The outer housing body 70 is a resin molded product and includes a cylindrical tubular portion 71 extending in the front-rear direction. The tubular portion 71 is attachable to the tubular portion 61 from the front side so as to cover the outer peripheral surface of the tubular portion 61 of the inner housing body 60 (see FIG. 6).

As shown in FIG. 3, an annular flange portion 72 protruding outward in the radial direction of the tubular portion 71 is provided at a position on a rear side of a center of an outer peripheral surface of the tubular portion 71 in the front-rear direction. The flange portion 72 has a rectangular outer peripheral shape when viewed in the front-rear direction. Bolt insertion holes 73 penetrating in the front-rear direction are formed in four corners of the flange portion 72, respectively. Bolts (not shown) for fixing the connector 1 to the attachment target portion of the connector 1 are inserted into the Bolt insertion holes 73.

The components constituting the housing 20 have been described above.

Next, an assembly procedure of the connector 1 will be described. First, the pair of terminals 10 to which one end portions of the pair of electric wires 2 are connected are inserted into the base holder 30. Therefore, as preparation of the insertion, as shown in FIGS. 5 and 6, the pair of electric wire insertion holes 43 of the rear holder 40 are inserted, from the front side, into the coatings 2b of the pair of electric wires 2 connected to the pair of terminals 10, then cylindrical rubber packings 93 extending in the front-rear direction are inserted, from the front side, into the respective coatings 2b of the pair of electric wires so as to be adjacent to a front side of the rear wall portion 42 of the rear holder 40, and then cylindrical heat storage members 95 extending in the front-rear direction are inserted, from the front side, into the respective coatings 2b of the pair of electric wires so as to be adjacent to a front side of the packings 93. Further, the O-ring 92 (see FIGS. 6 and 7) made of rubber is attached to the each of the annular grooves 17 of the pair of terminals 10.

The heat storage member 95 is made of a metal material capable of sensible heat storage, and has a function of absorbing heat generated at the connection portion between the electric wire 2 and the terminal 10 and dissipating the heat to the outside (this will be described later). The heat storage member 95 is inserted into a gap between an outer peripheral surface of the large diameter portion 12 of the terminal 10 and an inner peripheral surface of the medium diameter portion 34 of the base holder 30 (terminal holding portion 31) (see FIGS. 6 and 7). A tapered portion 95a that is inclined along an inner peripheral surface of the step portion 38 (see FIG. 7) of the base holder 30 is provided at a distal end portion of the heat storage member 95. The inner peripheral surface of the heat storage member 95 is at least partially in contact with the outer peripheral surface of the large diameter portion 12 of the terminal 10, and the outer peripheral surface of the heat storage members 95 is at least partially in contact with the inner peripheral surface of the medium diameter portion 34 of the base holder 30.

Next, the pair of terminals 10 are inserted, from the rear side, into the internal spaces 31a (see FIGS. 6 and 7) of the pair of terminal holding portions 31 of the base holder 30. This insertion is continued until the small diameter portions 11 and the female terminal portions 14 of the pair of terminals 10 protrude forward from front ends of the pair of terminal holding portions 31 and the step portions 13 of the pair of terminals 10 are locked to the locking protrusions 37 of the pair of terminal holding portions 31. In a state in which the insertion is completed (that is, a state in which the insertion of the pair of terminals 10 into the base holder 30 is completed), as shown in FIGS. 6 and 7, the O-rings 92 mounted on the terminals 10 are in pressure contact with the inner wall surfaces of the small diameter portions 33 of the terminal holding portions 31.

Next, a predetermined amount of heat transfer member 96 is injected into the internal spaces 31a of the pair of terminal holding portions 31 of the base holder 30 (more specifically, gaps between outer peripheral surfaces of the electric wires 2 and the terminals 10 and inner peripheral surfaces of the terminal holding portions 31 (the medium diameter portions 34 and the large diameter portions 35), see FIGS. 6 and 7). The heat transfer member 96 is configured by mixing a substance for promoting heat transfer, such as alumina particles, into a base material having fluidity and viscosity, such as a grease or a silicone paste. The heat transfer member 96 has a function of promoting the heat transfer from the connection portion between the electric wire 2 and the terminal 10 to the heat storage member 95 (that is, heat absorption from the connection portion) and the heat transfer from the heat storage member 95 to the terminal holding portion 31 (that is, heat dissipation to the outside of the housing 20) (this will be described later).

Next, the rear holder 40 is mounted on the base holder 30. Therefore, by pressing the rear holder 40 forward and moving the rear holder 40, the pair of packings 93 positioned on the front side of the rear holder 40, and the pair of heat storage members 95 positioned on the front side of the pair of packings 93 forward with respect to the pair of electric wires 2, the tubular portions 41 of the rear holder 40 are mounted to the rear end portion of the base holder 30 (see FIGS. 4, 6, and 7).

In a state in which the rear holder 40 is completely mounted on the base holder 30, as shown in FIGS. 6 and 7, each of the heat storage members 95 is located in the gap between the outer peripheral surface of the large diameter portion 12 of the terminal 10 and the inner peripheral surface of the medium diameter portion 34 of the terminal holding portion 31. In the first embodiment, at least a part of the inner peripheral surface of each of the heat storage members 95 is in close contact with the outer peripheral surface of the large diameter portion 12 of the terminal 10. That is, the heat storage members 95 are in contact with the connection portions (the large diameter portions 12) between the electric wires 2 and the terminals 10. An action due to this contact will be described later. The heat storage members 95 may be crimped and fixed to the terminals 10 (the outer peripheral surfaces of the large diameter portions 12) collectively when the electric wires 2 and the terminals 10 are crimped and fixed.

Further, the heat transfer member 96 located in the internal space 31a of the terminal holding portion 31 is pushed away by the heat storage member 95 that is entered the internal space 31a, and as shown in FIG. 7, is located in the internal space 31a so as to fill gaps H remaining around the heat storage member 95. For example, the heat transfer member 96 is filled in the gaps H generated between the heat storage member 95, the inner wall surface of the base holder 30, the outer wall surface of the terminal 10, and the electric wire 2. Further, for example, when the recess 15 of the terminal 10 is crimped to the conductor core wire 2a (for example, crimped to have a hexagonal cross-sectional shape) and thus the recess 15 has a non-circular cross-sectional shape, the heat transfer member 96 is filled in the gap H generated between the recess 15 and the heat storage member 95. An action of the heat transfer member 96 filling the gaps H will be described later.

Further, each of the packings 93 is pressed and sandwiched between the inner wall surface of the large diameter portion 35 of the terminal holding portion 31 and the outer peripheral surface of the electric wire 2 (coating 2b). Specifically, a plurality of ribs 93a of each of the packings 93 are pressed against the inner wall surface of the large diameter portion 35 and the outer peripheral surface of the electric wire 2 (the coating 2b). As a result, the internal spaces 31a of the pair of terminal holding portions 31 are isolated from the outside by a water-stopping function of the pair of O-rings 92 and the pair of packings 93. As a result, intrusion of water from the outside into the internal spaces 31a of the pair of terminal holding portions 31 (that is, the connection portions between the electric wires 2 and the terminals 10) is prevented. Further, the pair of terminals 10 are held in a state of being spaced apart from each other in the width direction and being insulated from each other by the base holder 30, and the pair of electric wires 2 extending rearward from the pair of terminals 10 are held in a state of being spaced from each other in the width direction by the rear holder 40.

When the mounting of the rear holder 40 on the base holder 30 is completed, then, the heat sink 50 is mounted on the base holder 30 (see FIG. 3). Therefore, the tubular portion 51 of the heat sink 50 is attached to the base holder 30 from the front side so as to cover the outer peripheral surfaces of the pair of medium diameter portions 34 and the coupling portion 32 of the base holder 30 (see FIG. 6). In a state in which the mounting is completed, as shown in FIGS. 6 and 7, the rear end surface of the tubular portion 51 is in contact with the step portion 36 of the base holder 30. In this state, positions of front end surfaces of the pair of extending portions 52 of the heat sink 50 in the front-rear direction coincide with positions of front end surfaces of the pair of terminal holding portions 31 in the front-rear direction.

When the mounting of the heat sink 50 to the base holder 30 is completed, next, as shown in FIG. 6, the heat transfer sheet 80 is attached to each of the annular grooves 16 of the pair of terminals 10 located and exposed on the front side of the front ends of the pair of terminal holding portions 31 (that is, the front ends of the small diameter portions 33), and then the lock pieces 94 are attached so as to be adjacent to the front side of the heat transfer sheet 80.

The heat transfer sheet 80 is made of a material having an insulating property and an excellent heat transfer property, and has a function of transferring heat from the terminal 10 to the heat sink 50 (this will be described later). As shown in FIG. 6, the heat transfer sheet 80 is mounted such that one end portion thereof is locked to the annular groove 16 and the other end portion thereof abuts on the front end surface of the extending portions 52 of the heat sink 50.

The lock pieces 94 have a function of preventing the heat sink 50 mounted on the base holder 30 from coming off (separating) forward from the base holder 30. The lock piece 94 is a plate body made of resin, and has a shape corresponding to the heat transfer sheet 80. The lock piece 94 is mounted such that one end portion thereof is locked to the annular groove 16 and the other end portion thereof abuts on the front end surface of the other end portion of the heat transfer sheet 80.

In this way, by mounting the heat transfer sheet 80 and the lock piece 94 in each of the annular grooves 16 of the pair of terminals 10, as shown in FIG. 6, one end portion of the heat transfer sheet 80 is sandwiched in the front-rear direction by a groove side surface on the rear side of the annular groove 16 of the terminal 10 and one end portion of the lock piece 94, and the other end portion of the heat transfer sheet 80 is sandwiched in the front-rear direction by the front end surface of the extending portion 52 of the heat sink 50 and the other end portion of the lock piece 94.

As a result, one end portion of the heat transfer sheet 80 is in close contact with (the annular groove 16 of) the terminal 10, and the other end portion of the heat transfer sheet 80 is in close contact with (the extending portion 52 of) the heat sink 50, whereby the heat transfer sheet 80 can transfer heat from the terminal 10 to the heat sink 50. Further, one end portion of the lock piece 94 is attached to the annular groove 16 of the terminal 10, and the other end portion of the lock piece 94 is locked to the front end surface of the extending portion 52 of the heat sink 50 via the other end portion of the heat transfer sheet 80, whereby the heat sink 50 attached to the base holder 30 is prevented from coming off (separating) forward from the base holder 30.

When the heat transfer sheet 80 and the lock piece 94 are mounted in each of the annular grooves 16 of the pair of terminals 10, the inner housing body 60 is then mounted on the heat sink 50 (see FIGS. 3 and 6). Therefore, the inner housing body 60 is mounted on the heat sink 50 from the front side such that the pair of side wall portions 53 of the heat sink 50 cover a part of the outer peripheral surface of the tubular portion 61 of the inner housing body 60 and the female terminal portions 14 of the pair of terminals 10 are inserted into the pair of female terminal housing portions 64 of the inner housing body 60 (see FIG. 6). In a state in which the mounting is completed, as shown in FIG. 6, the front end surfaces of the pair of side wall portions 53 of the heat sink 50 contact a rear end surface of the flange portion 65 of the inner housing body 60.

When the mounting of the inner housing body 60 to the heat sink 50 is completed, the outer housing body 70 is then mounted on the inner housing body 60 (see FIGS. 3 and 6). Therefore, the outer housing body 70 is mounted on the inner housing body 60 from the front side such that the tubular portion 71 of the outer housing body 70 covers the outer peripheral surface of the tubular portion 61 of the inner housing body 60 (see FIG. 6). When the mounting is completed, as shown in FIG. 6, the rear end surface of the tubular portion 71 of the outer housing body 70 is in contact with the front end surface of the flange portion 65 of the inner housing body 60.

When the mounting of the outer housing body 70 on the inner housing body 60 is completed, as shown in FIG. 3, a plurality of (four in the first embodiment) bolts 91 are then inserted from the rear side into the plurality of bolt insertion holes 55 of the heat sink 50 and the plurality of bolt insertion holes 67 of the inner housing body 60, and fastened to a plurality of fastening portions (not shown) provided in the outer housing body 70. Accordingly, the heat sink 50 and the inner housing body 60 are fastened together to the outer housing body 70, whereby the base holder 30, the rear holder 40, the heat sink 50, the inner housing body 60, and the outer housing body 70 that form the frame components of the housing 20 are integrated. Accordingly, the assembly of the connector 1 is completed, and the connector 1 shown in FIG. 1 is obtained.

The assembled connector 1 is fastened and fixed to the attachment target portion (not shown) of the connector 1 provided in the vehicle using a plurality of bolts (not shown) inserted into the plurality of bolt insertion holes 73 of the outer housing body 70.

When the battery (not shown) mounted on the vehicle is charged, the counterpart connector (so-called charging gun) is fitted into the fitting recess 63 of the connector 1 fixed to the attachment target portion of the vehicle. Accordingly, the electric power is supplied from the outside of the vehicle to the battery via the counterpart connector, the connector 1, and the pair of electric wires 2 in this order, and the battery is charged.

Next, an operation of providing the heat sink 50 made of metal and the heat transfer sheet 80 on the connector 1 will be described. As described above, when the battery is charged using the connector 1, the temperature of the pair of terminals 10 in the connector 1 increases due to Joule heat caused by energization. In particular, in a case of fast battery charging, since a large current passes through the pair of terminals 10 in a short time, a degree of temperature rise per unit time of the pair of terminals 10 is likely to increase.

In this regard, in the first embodiment, the heat generated in the terminals 10 is mainly transferred to the heat sink 50 via the heat transfer sheets 80 and is absorbed by the heat sink 50. The heat absorbed by the heat sink 50 is dissipated to the outside through an outer surface (surface exposed to the outside) of the heat sink 50. As a result, a temperature rise of the terminals 10 is prevented.

Further, the heat sink 50 is made of metal instead of resin. In general, when a metal member and a resin member are compared with each other in the same volume, a heat capacity of the metal member is larger than a heat capacity of the resin member due to a fact that a density of metal is higher than a density of resin. Therefore, the heat capacity of the metal heat sink 50 is larger than the heat capacity of the resin heat sink having the same shape as the heat sink 50. That is, when the heat sink 50 is made of metal instead of resin, the heat capacity of the heat sink 50 can be further increased. A material of the heat sink 50 is not necessarily limited to metal, and may be any other material as long as the heat sink 50 has an appropriate heat capacity as described above.

The larger the heat capacity of the heat sink 50 is, the more moderate the temperature rise of the heat sink 50 that absorbs the heat generated in the terminals 10 becomes. Therefore, for example, even when the Joule heat generated in the terminals 10 is large as in the case of the fast charging, the temperature rise of the heat sink 50 can be made moderate by using the heat sink 50 made of metal and having the large heat capacity, and as a result, the temperature rise of the terminals 10 can also be made slow.

The temperature of the heat sink 50, which rises due to the fast charging, falls due to natural heat dissipation after the fast charging is completed. At that time, as the heat capacity of the heat sink 50 increases, a temperature decrease of the heat sink 50 becomes moderate (that is, a relatively long time is required until the temperature of the heat sink 50 returns to a normal temperature). However, the connector 1 is not used for a purpose other than charging of the battery, and it is difficult to assume a situation in which the fast charging is started again after a short period of time after completion of the fast charging. Therefore, even if the temperature decrease of the heat sink 50 after the fast charging becomes moderate (even if a relatively long time is required until the temperature of the heat sink 50 returns to the normal temperature), there is no problem in light of the function of the connector 1.

Further, the heat sink 50 forms a part of the frame components of the housing 20. Therefore, an increase in a size of the connector 1 can be prevented as compared to an aspect in which a heat sink for absorbing and dissipating heat generated in the terminals 10 is assembled to the outside of the housing 20 (connector 1).

Next, an operation of providing the heat storage members 95 and the heat transfer members 96 in the connector 1 will be described. As described above, when the battery is charged using the connector 1, the temperature of the pair of terminals 10 in the connector 1 increases due to Joule heat caused by energization. In particular, the connection portion between the electric wire 2 and the terminal 10 is a portion at which the amount of heat generation is large due to a magnitude of a contact resistance, and it is difficult to dissipate the heat to the outside because the connection portion is sealed by the O-ring 92 and the packing 93 and isolated from the outside in the internal space 31a of the terminal holding portion 31, and the air in the isolated internal space 31a functions as a heat insulating material. Therefore, in order to make the temperature rise of the terminal 10 moderate, it is important to efficiently absorb the heat generated at the connection portion between the electric wire 2 and the terminal 10.

In this regard, in the first embodiment, the heat storage member 95 in contact with the connection portion between the electric wire 2 and the terminal 10 is housed in the internal space 31a of the terminal holding portion 31. In other words, the heat storage member 95 is disposed so as to reduce the gaps H (see FIG. 7) around the connection portion between the electric wire 2 and the terminal 10 in the internal space 31a.

Further, the heat storage member 95 is made of metal. In general, when a metal member and air are compared with each other in the same volume, the heat capacity of the metal member is larger than a heat capacity of the air due to a fact that the density of the metal is higher than a density of the air. Therefore, the heat capacity of the heat storage member 95 made of metal is larger than the heat capacity of the air having the same volume as that of the heat storage member 95. That is, by housing the heat storage member 95 made of metal in the internal space 31a of the terminal holding portion 31, the substantial heat capacity of the entire internal space 31a can be further increased. Further, since the heat storage member 95 is present in the internal space 31a, an amount of air in the internal space 31a functioning as the heat insulating material can be reduced. A material constituting the heat storage member 95 is not necessarily limited to metal, and may be the other materials as long as the materials have a heat capacity capable of making the substantial heat capacity of the entire internal space 31a larger than that in a case in which the heat storage member 95 is not provided as described above.

As described above, by absorbing the heat generated at the connection portion between the electric wire 2 and the terminal 10 at the time of energization by the heat storage member 95 having the large heat capacity, even when the amount of heat generated at the connection portion per unit time is large as at the time of fast charging, it is possible to prevent a rapid increase in the temperature of the terminal 10 and to moderately increase the temperature of the terminal 10.

Further, in the first embodiment, the heat transfer member 96 made of a material having fluidity and viscosity is disposed in the internal space 31a of the terminal holding portion 31 so as to fill the gaps H (see FIG. 7) remaining around the heat storage member 95. Accordingly, the heat transfer from the connection portion between the electric wire 2 and the terminal 10 to the heat storage member 95 (that is, heat absorption from the connection portion) and the heat transfer (that is, heat dissipation to the outside) from the heat storage member 95 to the terminal holding portion 31 (that is, the housing 20) can be performed more efficiently.

Second Embodiment

Figure 8:
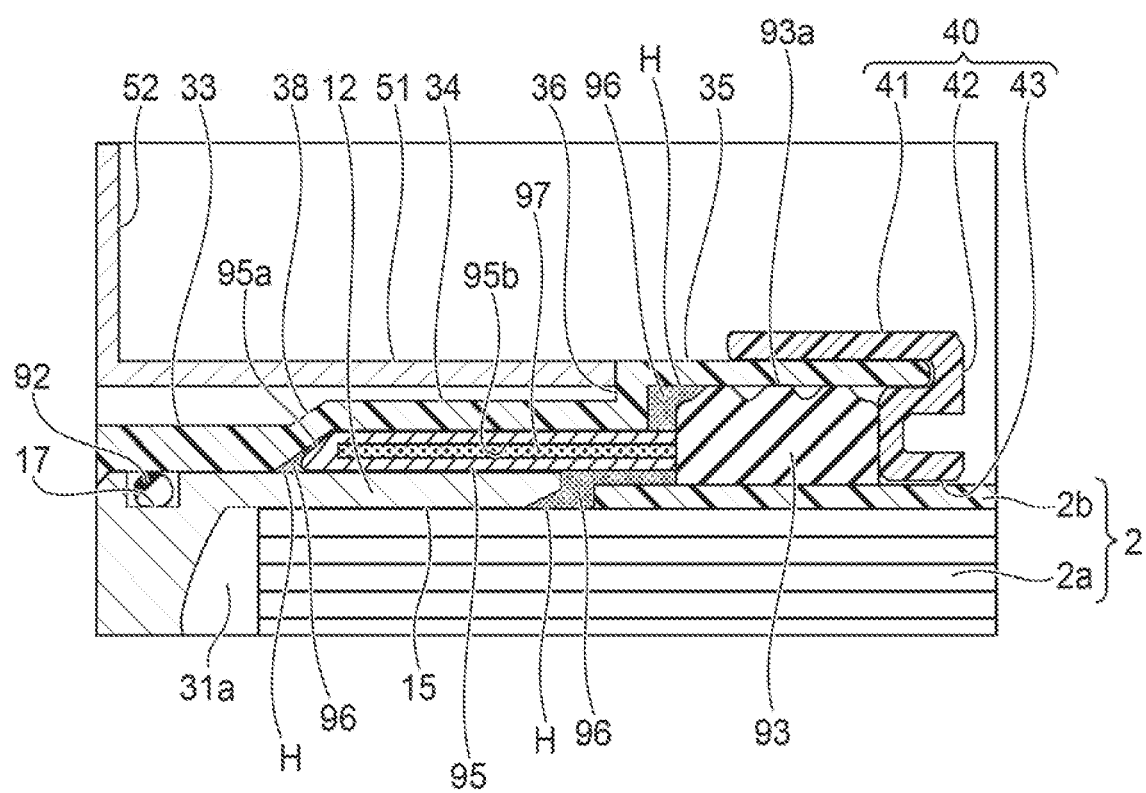
FIG. 8 is a view corresponding to FIG. 7 in a second embodiment.
Figure 8:
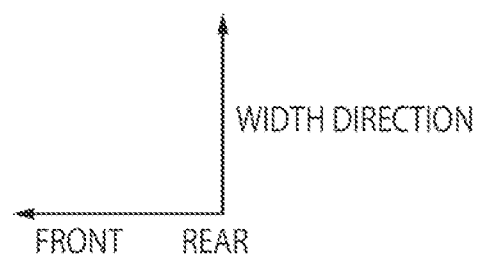

In the first embodiment described above, the entire heat storage member 95 is made of the metal material capable of the sensible heat storage (see FIG. 7). In contrast, in the connector 1 according to a second embodiment of the present invention, as shown in FIG. 8, a cylindrical gap 95b that opens rearward is formed inside the cylindrical heat storage member 95 made of metal, and a phase transition member 97 capable of latent heat storage is sealed in the gap 95b from the rear side. In the second embodiment shown in FIG. 8, an opening of the gap 95b in which the phase transition member 97 is sealed is closed by a front surface of the packing 93. In this way, since the opening of the gap 95b is closed, the phase transition member 97 sealed in the gap 95b does not leak from the gap 95b.

The phase transition member 97 is a member capable of the latent heat storage by phase transition from a solid phase to a liquid phase when reaching a predetermined temperature, and is typically formed of paraffin. In the second embodiment shown in FIG. 8, by utilizing a fact that heat storage characteristics are different between the heat storage member 95 capable of the sensible heat storage and the phase transition member 97 capable of the latent heat storage, when a mass ratio between the heat storage member 95 and the phase transition member 97 is appropriately set in consideration of a degree of heat generation (for example, an assumed maximum temperature of the connection portion) at the connection portion between the electric wire 2 and the terminal 10, the heat absorption from the connection portion and the heat dissipation to the outside can be performed more efficiently. Further, by replacing a part of the heat storage member 95 made of metal with the phase transition member 97 made of paraffin, a weight of the heat storage member 95 can be reduced.

Third Embodiment

Figure 9:
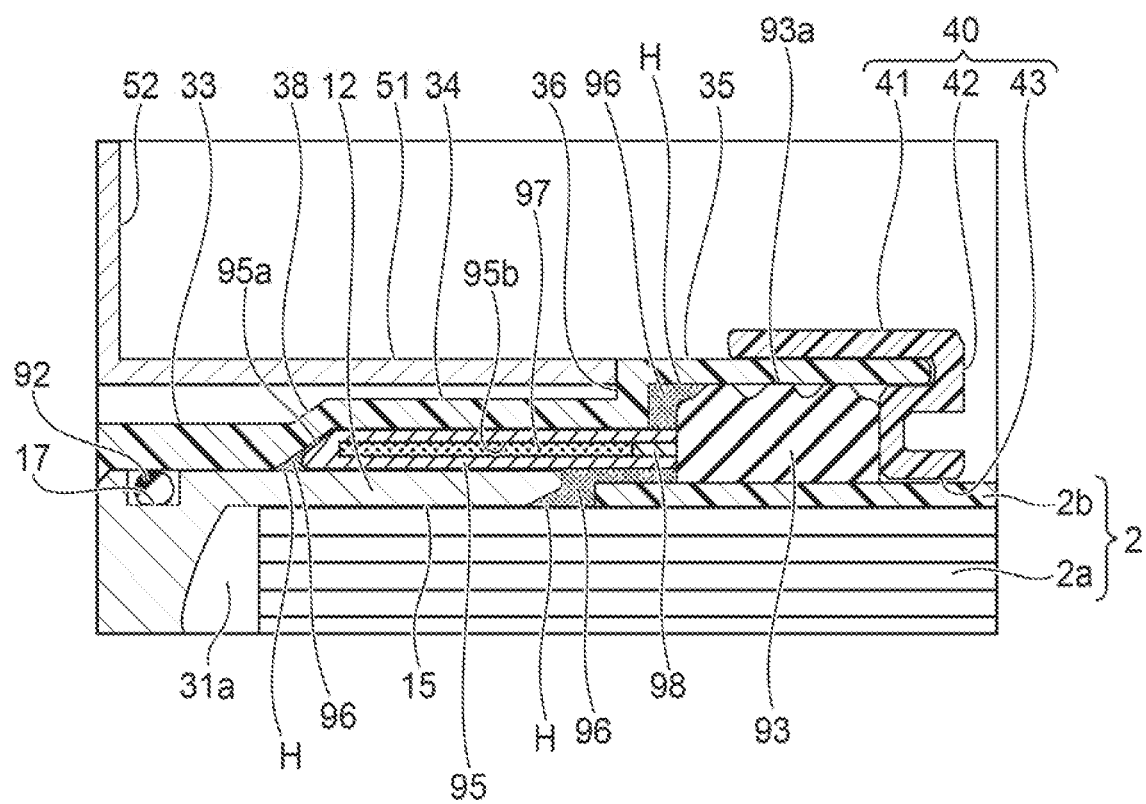
FIG. 9 is a view corresponding to FIG. 7 in a third embodiment.
Figure 9:
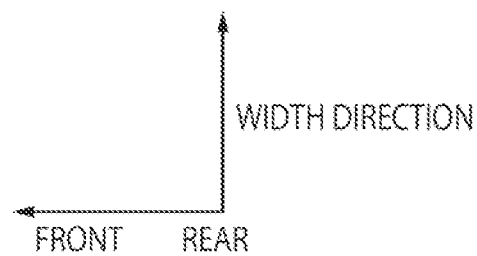

In the first embodiment described above, the entire heat storage member 95 is made of the metal material capable of the sensible heat storage (see FIG. 7). In contrast, in the connector 1 according to a third embodiment of the present invention, as shown in FIG. 9, the cylindrical gap 95b that opens rearward is formed inside the cylindrical heat storage member 95 made of metal, and the phase transition member 97 capable of the latent heat storage is sealed in the gap 95b from the rear side. In the third embodiment shown in FIG. 9, the opening of the gap 95b in which the phase transition member 97 is sealed is closed by an annular lid member 98. In this way, since the opening of the gap 95b is closed, the phase transition member 97 sealed in the gap 95b does not leak from the gap 95b.

As in the second embodiment, the phase transition member 97 is the member capable of the latent heat storage by phase transition from the solid phase to the liquid phase when reaching the predetermined temperature, and is typically formed of paraffin. In the third embodiment shown in FIG. 9, by utilizing the fact that the heat storage characteristics are different between the heat storage member 95 capable of the sensible heat storage and the phase transition member 97 capable of the latent heat storage, when the mass ratio between the heat storage member 95 and the phase transition member 97 is appropriately set in consideration of the degree of heat generation (for example, the assumed maximum temperature of the connection portion) at the connection portion between the electric wire 2 and the terminal 10, the heat absorption from the connection portion and the heat dissipation to the outside can be performed more efficiently. Further, by replacing a part of the heat storage member 95 made of metal with the phase transition member 97 made of paraffin, the weight of the heat storage member 95 can be reduced.

Fourth Embodiment

Figure 10:
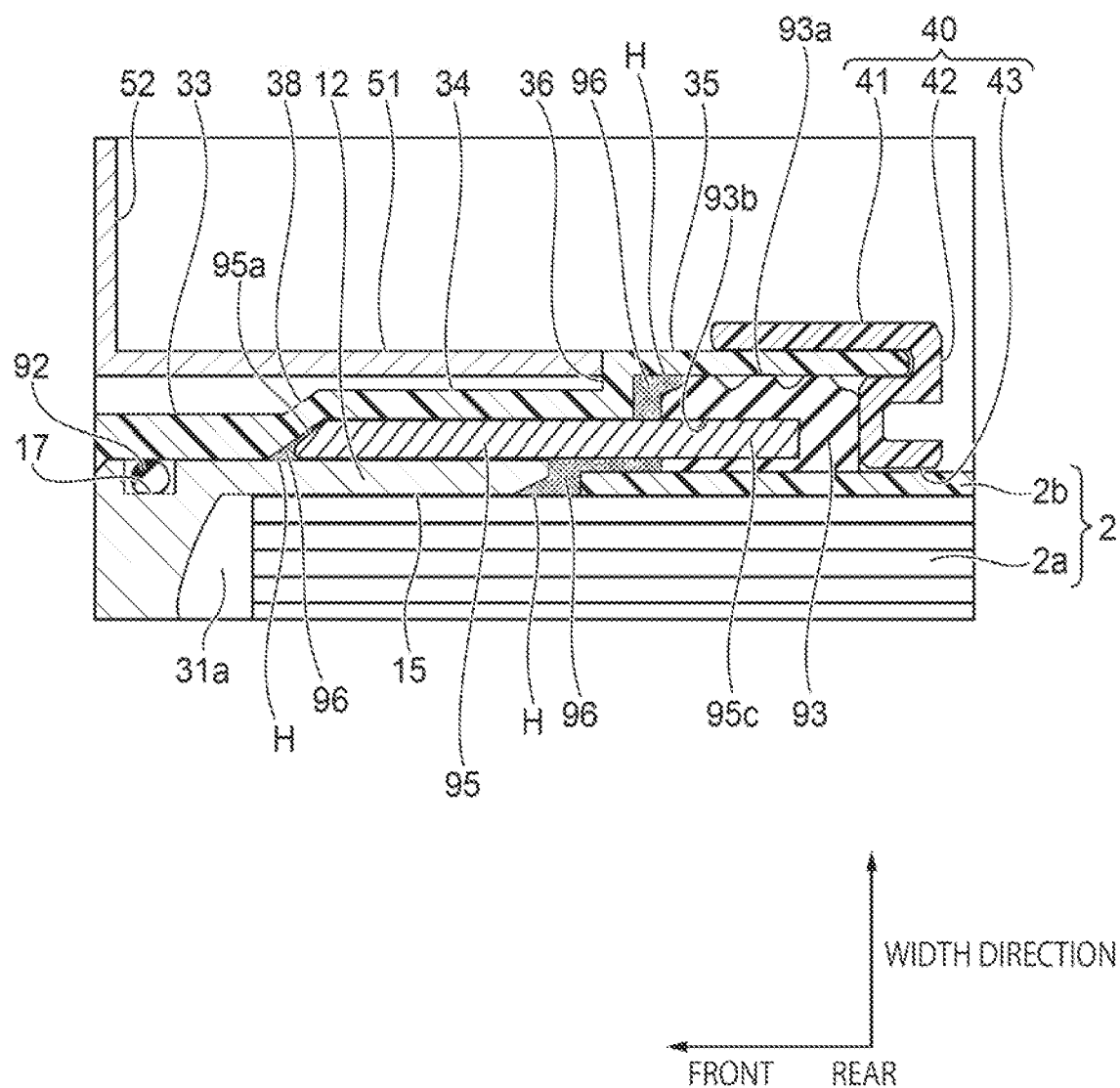
FIG. 10 is a view corresponding to FIG. 7 in a fourth embodiment.

In the connector 1 according to a fourth embodiment of the present invention, as shown in FIG. 10, a cylindrical gap 93b that opens forward is formed inside the cylindrical packing 93, an extending portion 95c that further extends rearward is formed at the cylindrical heat storage member 95, and the extending portion 95c of the heat storage member 95 is inserted into the gap 93b from the front side. In the fourth embodiment shown in FIG. 10, the packing 93 is in contact with both the inner peripheral surface and the outer peripheral surface of the cylindrical heat storage member 95 (the extending portion 95c). The packing 93 may be in contact with only one of the inner peripheral surface and the outer peripheral surface of the cylindrical heat storage member 95 (the extending portion 95c). Accordingly, the heat can be efficiently transferred from the heat storage member 95 to the packing 93, and the packing 93 can be used for heat storage in addition to the heat storage member 95. Therefore, the heat absorption from the connection portion between the electric wire 2 and the terminal 10 and the heat dissipation to the outside can be performed more efficiently.

Fifth Embodiment

Figure 11:
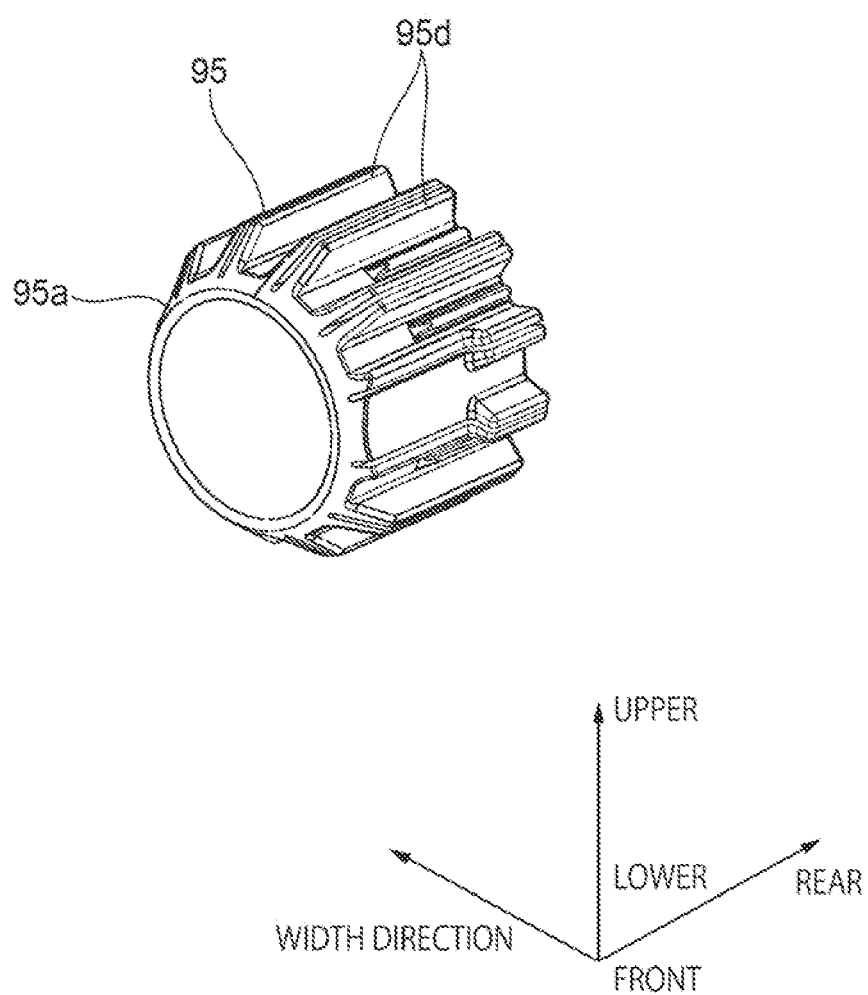
FIG. 11 is a perspective view showing a heat storage member used in a fifth embodiment.
Figure 12:
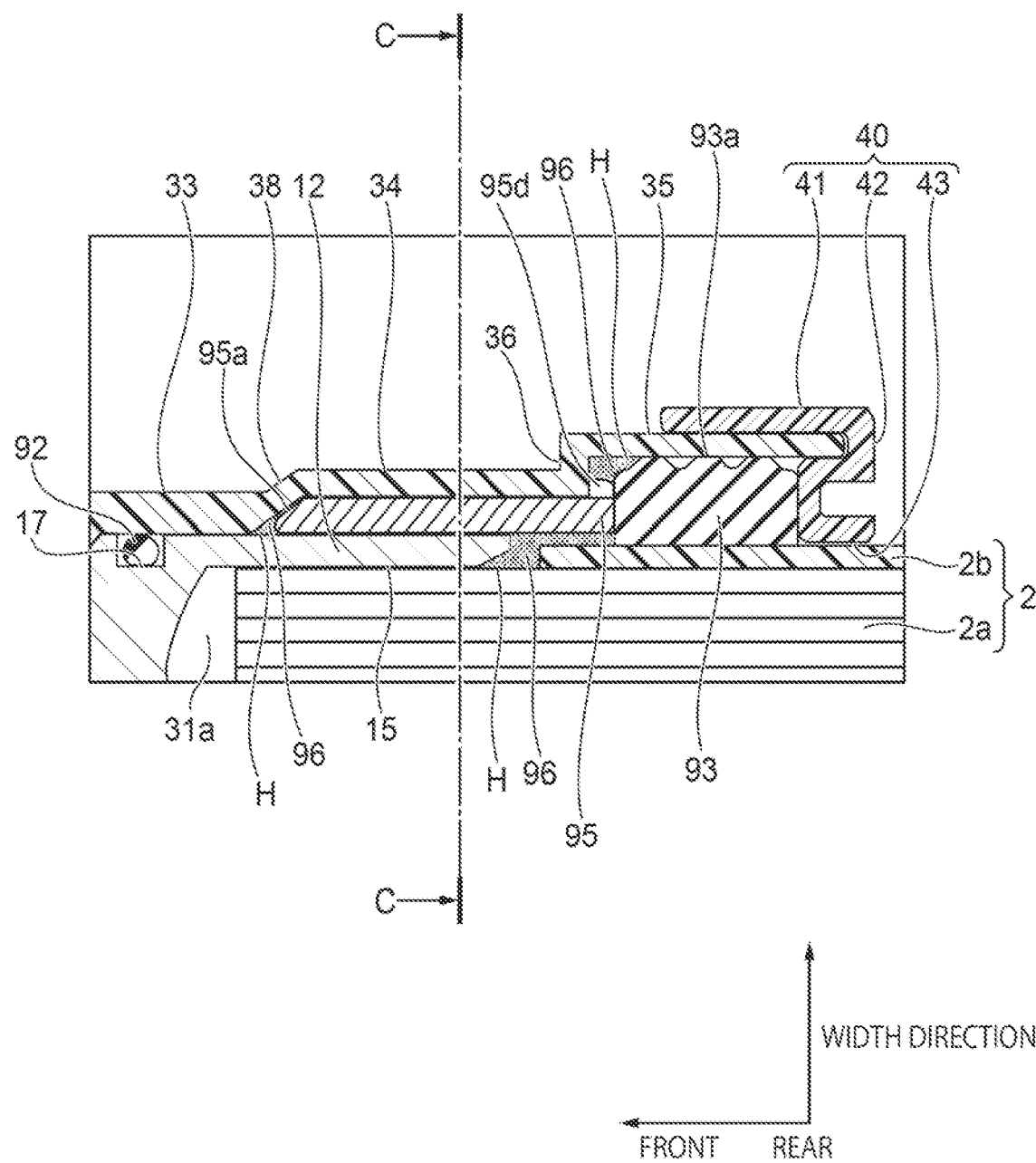
FIG. 12 is a view corresponding to FIG. 7 in the fifth embodiment (a heat sink is not shown).
Figure 13:
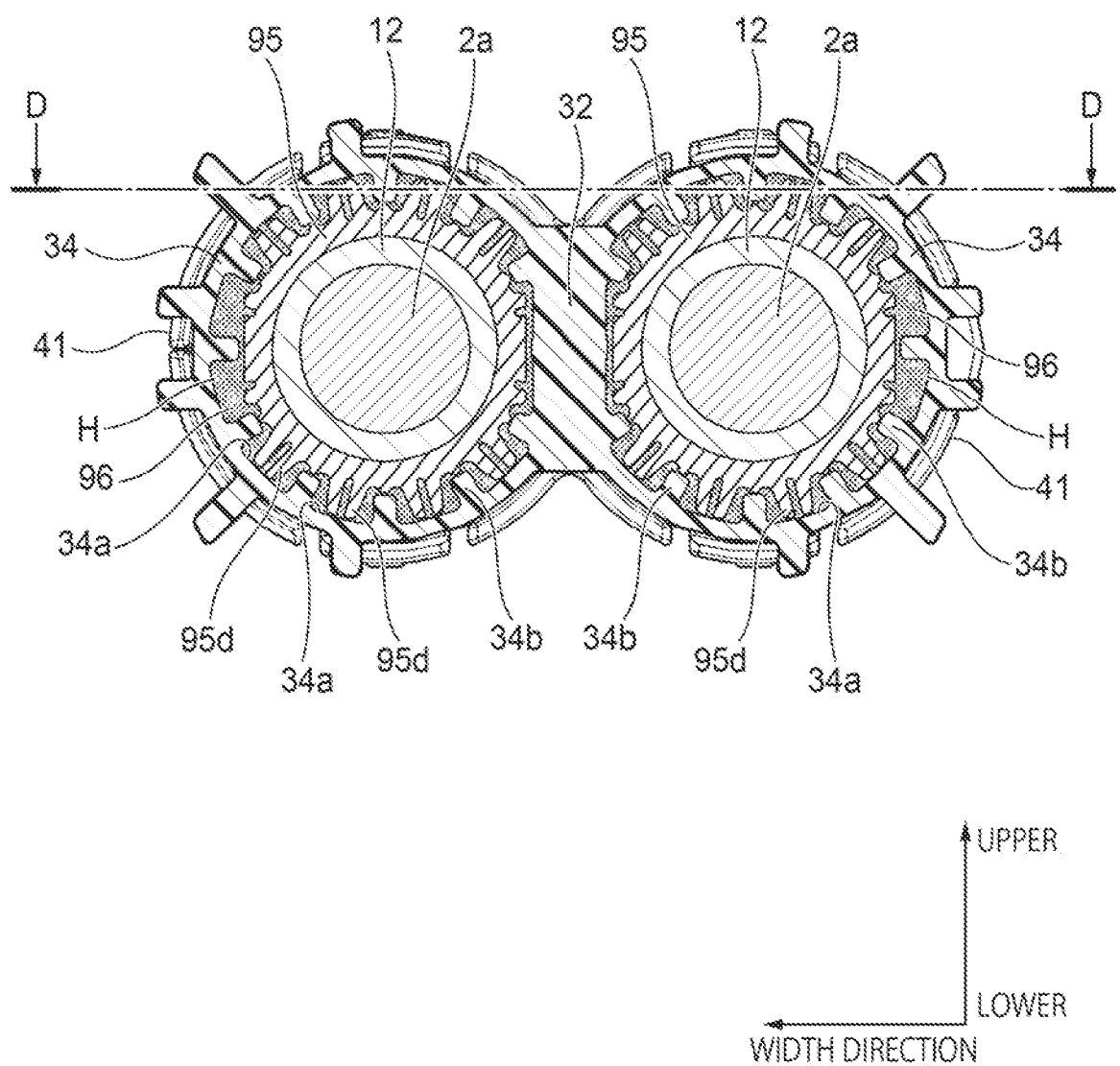
FIG. 13 is a cross-sectional view taken along a line C-C of FIG. 12.

In the first embodiment described above, the outer peripheral surface of the cylindrical heat storage member 95 is a flat surface having no protrusion (see FIG. 5). In contrast, in the connector 1 according to a fifth embodiment of the present invention, as shown in FIG. 11, projections 95d protruding outward in the radial direction and extending in the front-rear direction are provided at a plurality of positions in the circumferential direction on the outer peripheral surface of the cylindrical heat storage member 95. As shown in FIGS. 12 and 13, on the inner peripheral surface of the medium diameter portion 34 of the base holder 30 disposed so as to cover the outer periphery of the heat storage member 95, grooves 34a recessed outward in the radial direction and extending in the front-rear direction are provided at a plurality of positions in the circumferential direction so as to correspond to the plurality of projections 95d of the heat storage member 95. In other words, on the inner peripheral surface of the medium diameter portion 34 of the base holder 30, projections 34b protruding inward in the radial direction and extending in the front-rear direction are provided at a plurality of positions in the circumferential direction, and the grooves 34a are formed between the projections 34b adjacent to each other in the peripheral direction. Each of the plurality of projections 95d of the heat storage member 95 is received (inserted) in the corresponding groove 34a of the medium diameter portion 34. The heat transfer member 96 (see FIG. 12) located in the internal space 31a so as to fill the gaps H remaining around the heat storage member 95 are also filled in the gaps H between the projection 95d and the groove 34a arranged to face each other. As the heat transfer member 96, as in the first embodiment, a member in which a substance for promoting heat transfer, such as alumina particles, is mixed into a base material having fluidity and viscosity, such as a grease or a silicone paste, is used.

In FIG. 12, illustration of the heat sink 50 is omitted for convenience of description. The same applies to FIGS. 13, 14, 16, 17, 19, 21, 22, 24, 25, and 27.

As in the first embodiment, the heat storage member 95 shown in FIG. 11 may be housed in the base holder 30 (the medium diameter portion 34) after the terminal 10 is housed in the base holder 30, or may be collectively crimped and fixed to the terminal 10 (the outer peripheral surface of the large diameter portion 12) when the electric wire 2 and the terminal 10 are crimped and fixed to each other.

In the fifth embodiment, since the heat storage member 95 has the projections 95d, a volume of the heat storage member 95 is increased and a heat storage performance of the heat storage member 95 can be improved as compared to a case in which the heat storage member 95 does not have such protrusions. Further, since the projections 95d of the heat storage member 95 enter the grooves 34a of the medium diameter portion 34 of the base holder 30, a surface area contributing to the heat transfer between the heat storage member 95 and the medium diameter portion 34 increases, and the heat absorption from the connection portion (the large diameter portion 12) between the electric wire 2 and the terminal 10 and the heat dissipation to the outside can be performed more efficiently. In addition, since the gaps H between the projections 95d and the groove 34a are filled with the heat transfer member 96, an efficiency of the heat absorption and the heat dissipation is further improved.

Figure 14:
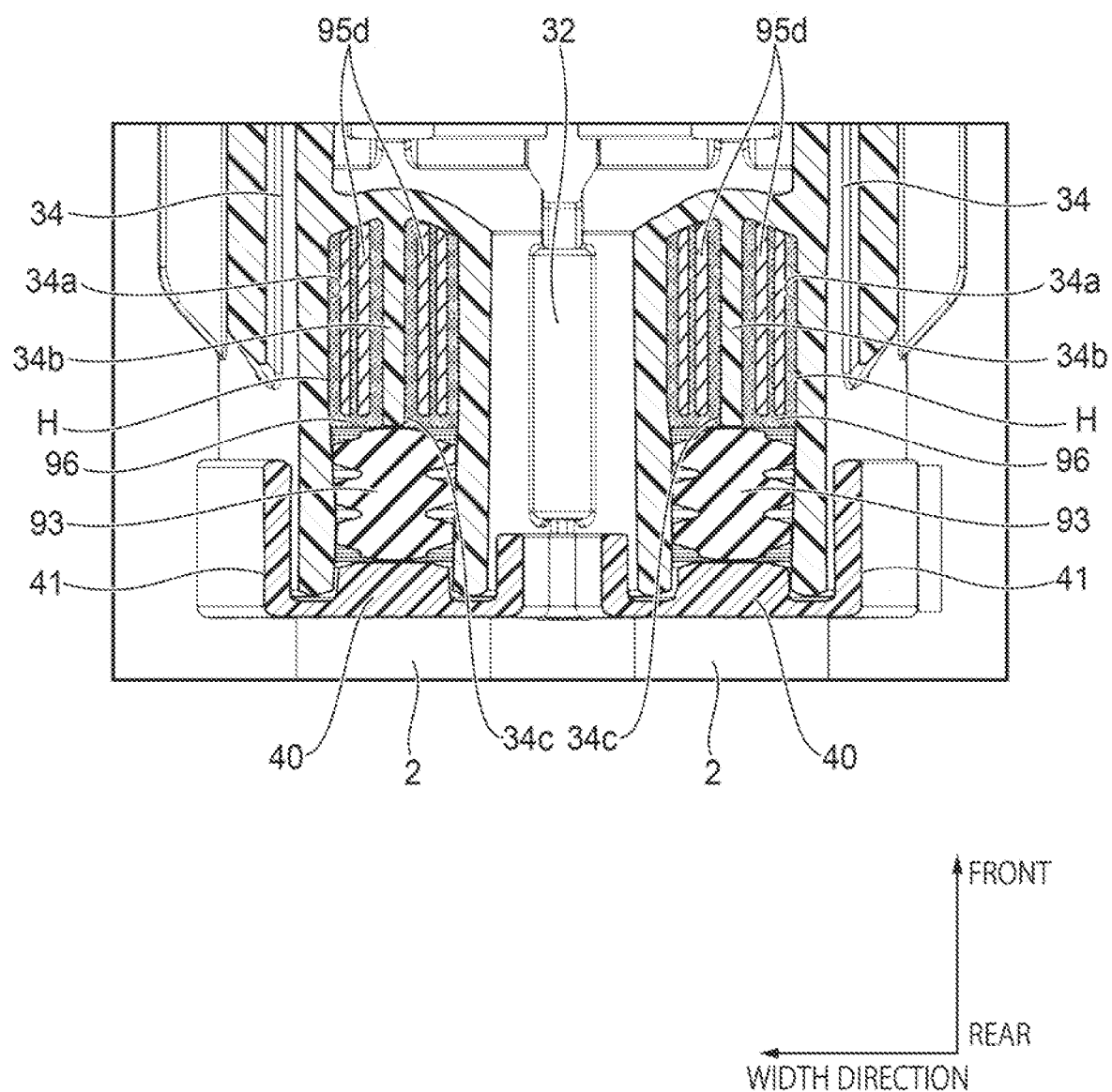
FIG. 14 is a cross-sectional view corresponding to a cross-sectional view taken along a line D-D of FIG. 13 in a modification of the fifth embodiment.

As shown in FIG. 12, in the fifth embodiment, the rear end portion of the heat storage member 95 is in contact with the front end portion of the packing 93, and the rear holder 40 is in contact with the rear end portion of the packing 93. That is, the packing 93 is sandwiched between the heat storage member 95 and the rear holder 40. In contrast, as in a modification of the fifth embodiment shown in FIG. 14, instead of the rear end portion of the heat storage member 95, rear end portions 34c of the projection 34b (see also FIG. 13) provided on the inner peripheral surface of the medium diameter portion 34 of the base holder 30 may be brought into contact with the front end portion of the packing 93. That is, in this modification, the packing 93 is sandwiched between the projections 34b and the rear holder 40. By sandwiching the packing 93 in this manner, the packing 93 is held (that is, positioned) at a predetermined position in the front-rear direction. FIG. 14 is a cross-sectional view of the connector 1 in a case in which the connector 1 according to the modification of the fifth embodiment is cut at a position corresponding to the cross-sectional view taken along the line D-D of FIG. 13, instead of the cross-sectional view taken along the line D-D of FIG. 13.

Sixth Embodiment

Figure 15:
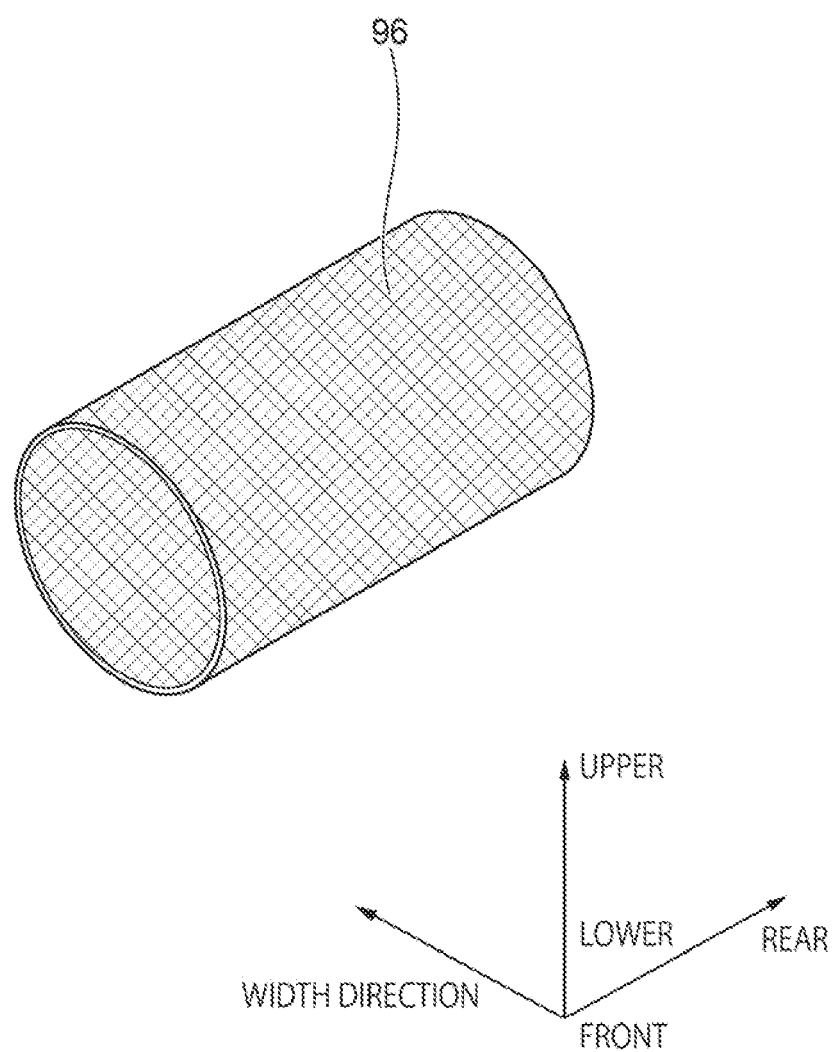
FIG. 15 is a perspective view showing a heat transfer member used in a sixth embodiment.
Figure 16:
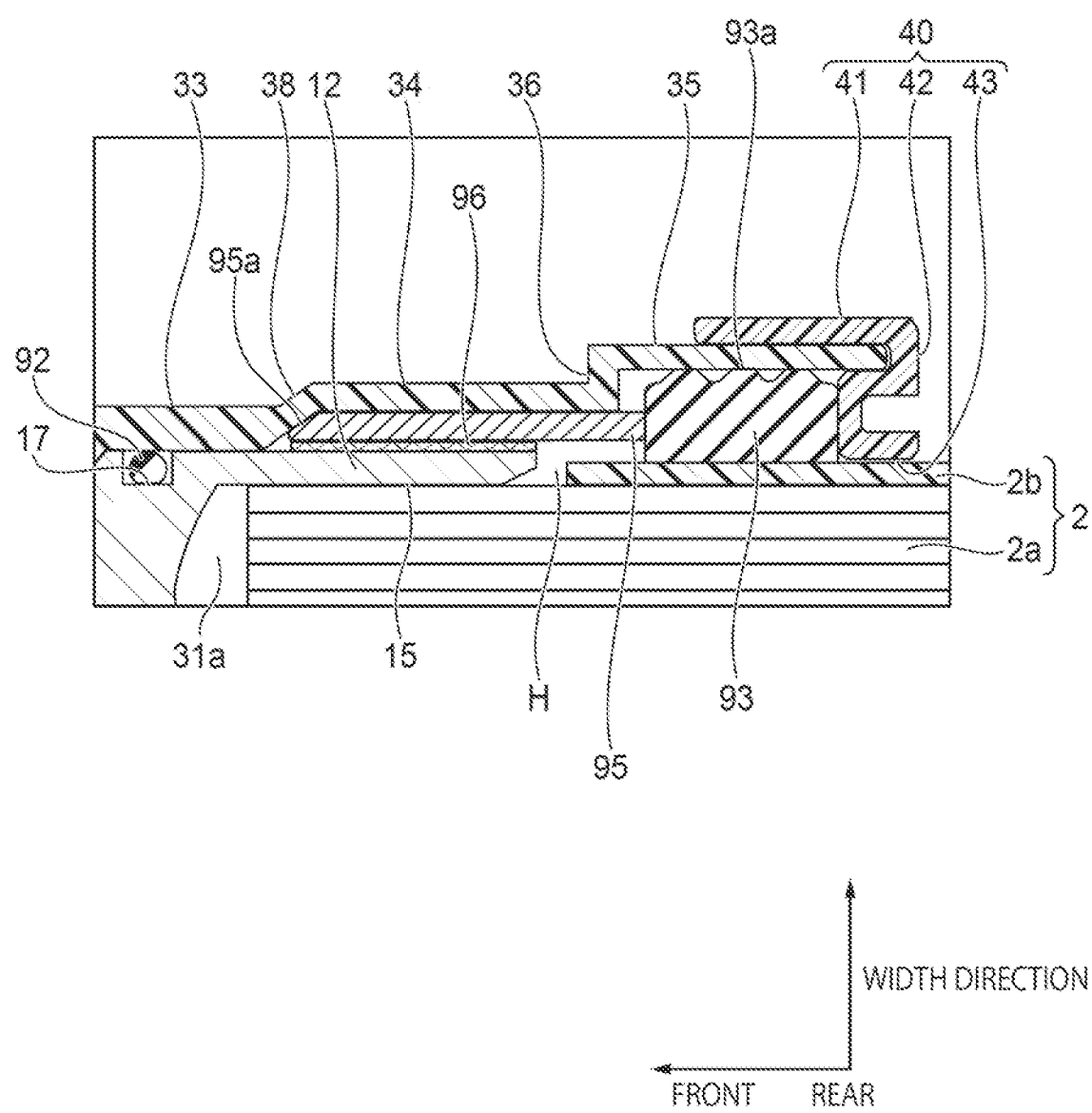
FIG. 16 is a view corresponding to FIG. 7 in the sixth embodiment (the heat sink is not shown).

In the first embodiment described above, as the heat transfer member 96 positioned in the internal space 31a so as to fill the gaps H remaining around the heat storage member 95, a member having fluidity in which a substance for promoting heat transfer, such as alumina particles, is mixed into a base material having fluidity and viscosity, such as a grease or a silicone paste, is used. In contrast, in the connector 1 according to the sixth embodiment of the present invention, as shown in FIG. 15, a cylindrical member formed by a metal mesh material (hereinafter, also referred to as a metal mesh) is used as the heat transfer member 96. As shown in FIG. 16, the cylindrical heat transfer member 96 shown in FIG. 15 is attached to the outer peripheral surface of the large diameter portion 12 of the terminal 10, and is fixed to the outer peripheral surface of the large diameter portion 12 by a method such as crimping or laser joining.

In the sixth embodiment, the terminal 10 in which the heat transfer member 96 shown in FIG. 15 is fixed to the outer peripheral surface of the large diameter portion 12 is housed in the base holder 30, and then the heat storage member 95 used in the first embodiment is housed in the base holder 30 (the medium diameter portion 34). Accordingly, as shown in FIG. 16, the heat storage member 95 is located in the gaps between the outer peripheral surface of the heat transfer member 96 and the inner peripheral surface of the medium diameter portion 34 of the terminal holding portion 31 shown in FIG. 15, and at least the inner peripheral surface of the heat storage member 95 is in close contact with the outer peripheral surface of the heat transfer member 96.

In the sixth embodiment, since the flexible heat transfer member 96 formed by the metal mesh can be easily deformed into a shape corresponding to the gaps H, the heat transfer member 96, the connection portion (large diameter portion 12) between the electric wire 2 and the terminal 10, and the heat storage member 95 can be sufficiently brought into close contact with each other. Therefore, the heat absorption from the connection portion (the large diameter portion 12) between the electric wire 2 and the terminal 10 and the heat dissipation to the outside can be performed more efficiently.

Further, in the sixth embodiment, the heat transfer member 96 is formed by the mesh material (metal mesh) formed by a wire material (metal wire) having a heat transfer property. The metal mesh has many minute irregularities on a surface thereof because the metal mesh has a portion at which the wire materials intersect with each other, a portion at which the wire materials are woven with each other, or the like. In these many irregularity portions, the wire material (mesh or the like) of the heat transfer member 96 comes into contact with the connection portion between the electric wire 2 and the terminal 10 and the heat storage member 95. Therefore, the heat absorption from the connection portion between the electric wire 2 and the terminal 10 and the heat dissipation to the outside can be performed more efficiently. Further, even when an external force such as a vibration is applied to the connector 1, the heat transfer member 96 is prevented from being pushed out (so-called pump-out) from the gaps around the heat storage member 95.

Seventh Embodiment

As in the sixth embodiment, in the connector 1 according to a seventh embodiment of the present invention, the cylindrical member formed by the metal mesh shown in FIG. 15 is used as the heat transfer member 96. In the sixth embodiment described above, the entire cylindrical heat transfer member 96 in the front-rear direction is fixed to the outer peripheral surface of the large diameter portion 12 of the terminal 10 (see FIG. 16). In contrast, in the seventh embodiment, as shown in FIG. 17, a front region 96a of the cylindrical heat transfer member 96 shown in FIG. 15 is disposed between the inner peripheral surface of the large diameter portion 12 of the terminal 10 and the outer periphery of the electric wire 2 (conductor core wire 2a) and is crimped and fixed to the large diameter portion 12 together with the electric wire 2, and a rear region 96b of the heat transfer member 96 is folded back to the outside in the radial direction and the front side and is in close contact with the outer peripheral surface of the large diameter portion 12.

Figure 17:
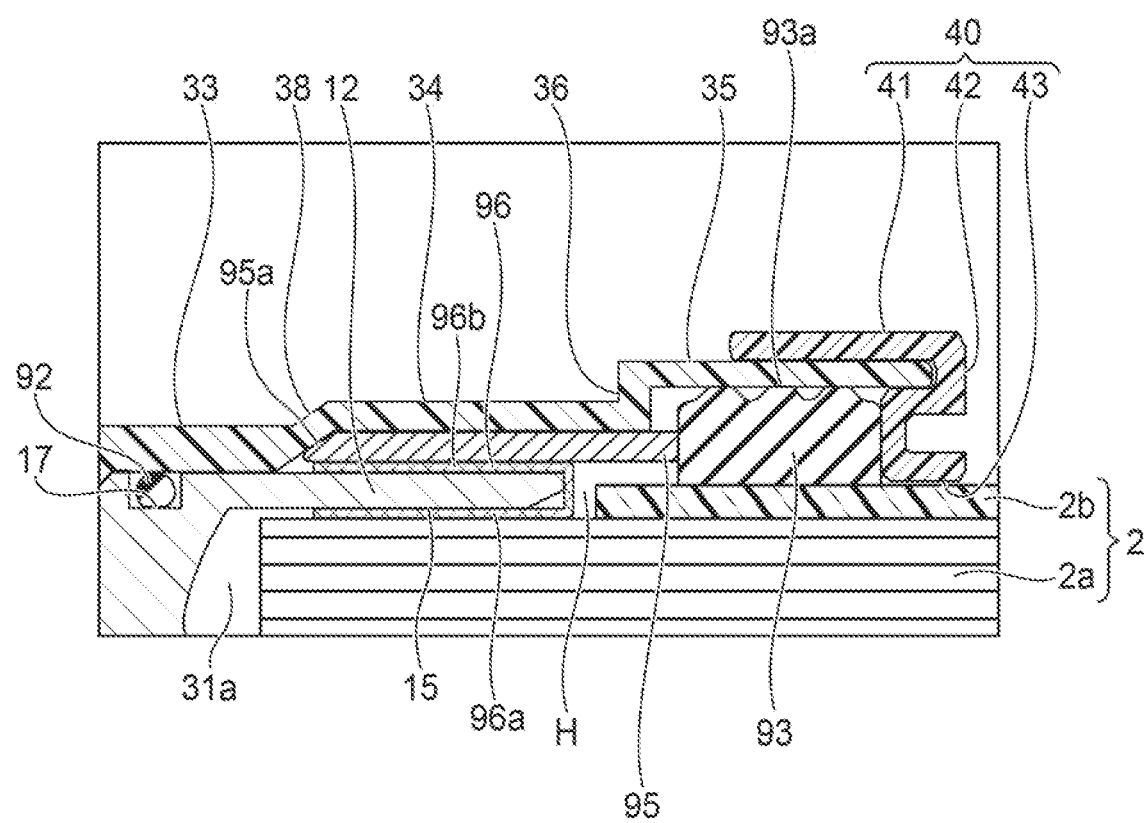
FIG. 17 is a view corresponding to FIG. 7 in a seventh embodiment (the heat sink is not shown).
Figure 17:
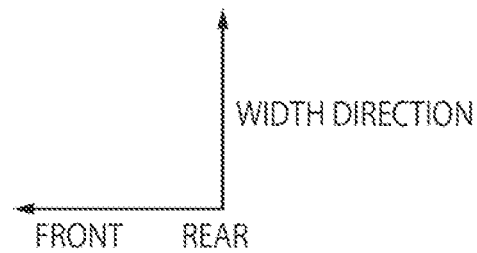

In the seventh embodiment, as shown in FIG. 17, the terminal 10 on which the heat transfer member 96 is disposed is housed in the base holder 30, and then the heat storage member 95 used in the first embodiment is housed in the base holder 30 (the medium diameter portion 34). Accordingly, as shown in FIG. 17, the heat storage member 95 is located in the gaps between an outer peripheral surface of the rear region 96b of the heat transfer member 96 and the inner peripheral surface of the medium diameter portion 34 of the terminal holding portion 31, and at least the inner peripheral surface of the heat storage member 95 is in close contact with the outer peripheral surface of the rear region 96b of the heat transfer member 96.

In the seventh embodiment, the same operations and effects as those of the sixth embodiment are achieved. Further, in the seventh embodiment, the conductive mesh material constituting the heat transfer member 96 is also disposed between the electric wire 2 and the terminal 10 (conductor core wire 2a) in addition to the gaps between the connection portion between the electric wire 2 and the terminal 10 and the heat storage member 95. Accordingly, the heat absorption from the connection portion between the electric wire 2 and the terminal 10 and the heat dissipation to the outside can be performed more efficiently, and reliability of the electrical connection between the electric wire 2 and the terminal 10 can be improved.

Eighth Embodiment

Figure 18:
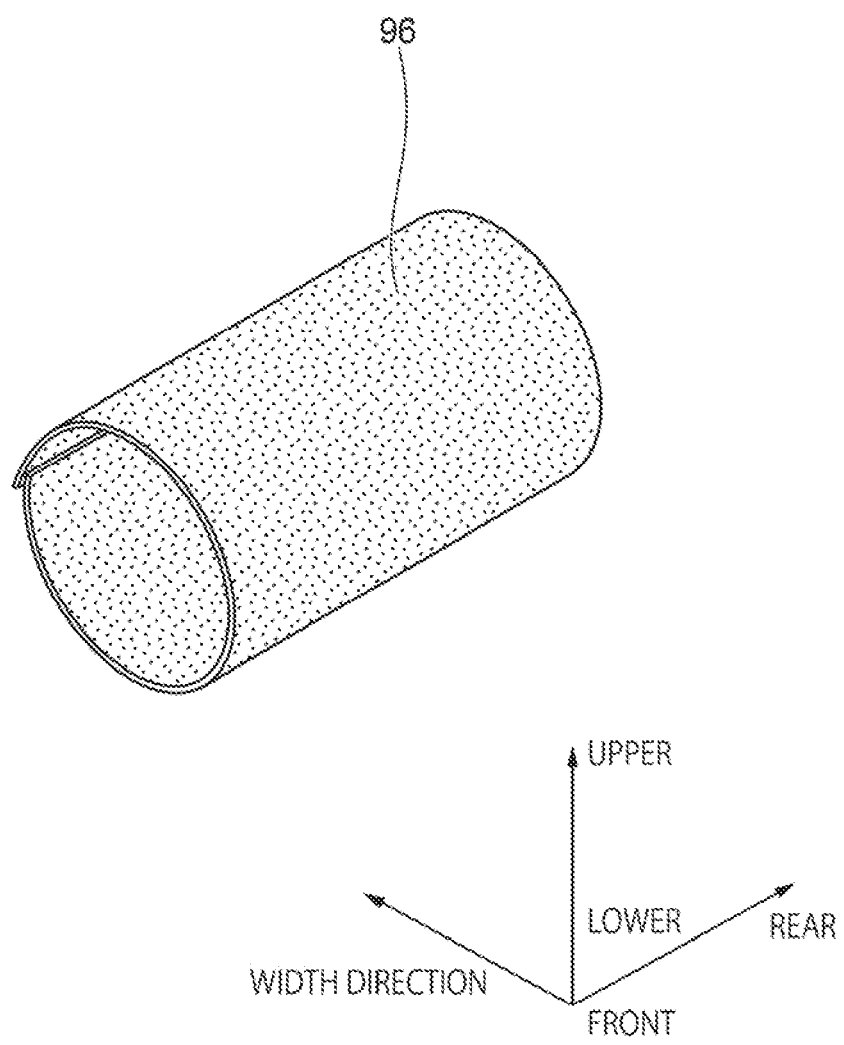
FIG. 18 is a perspective view showing a heat transfer member used in an eighth embodiment and a ninth embodiment.
Figure 19:
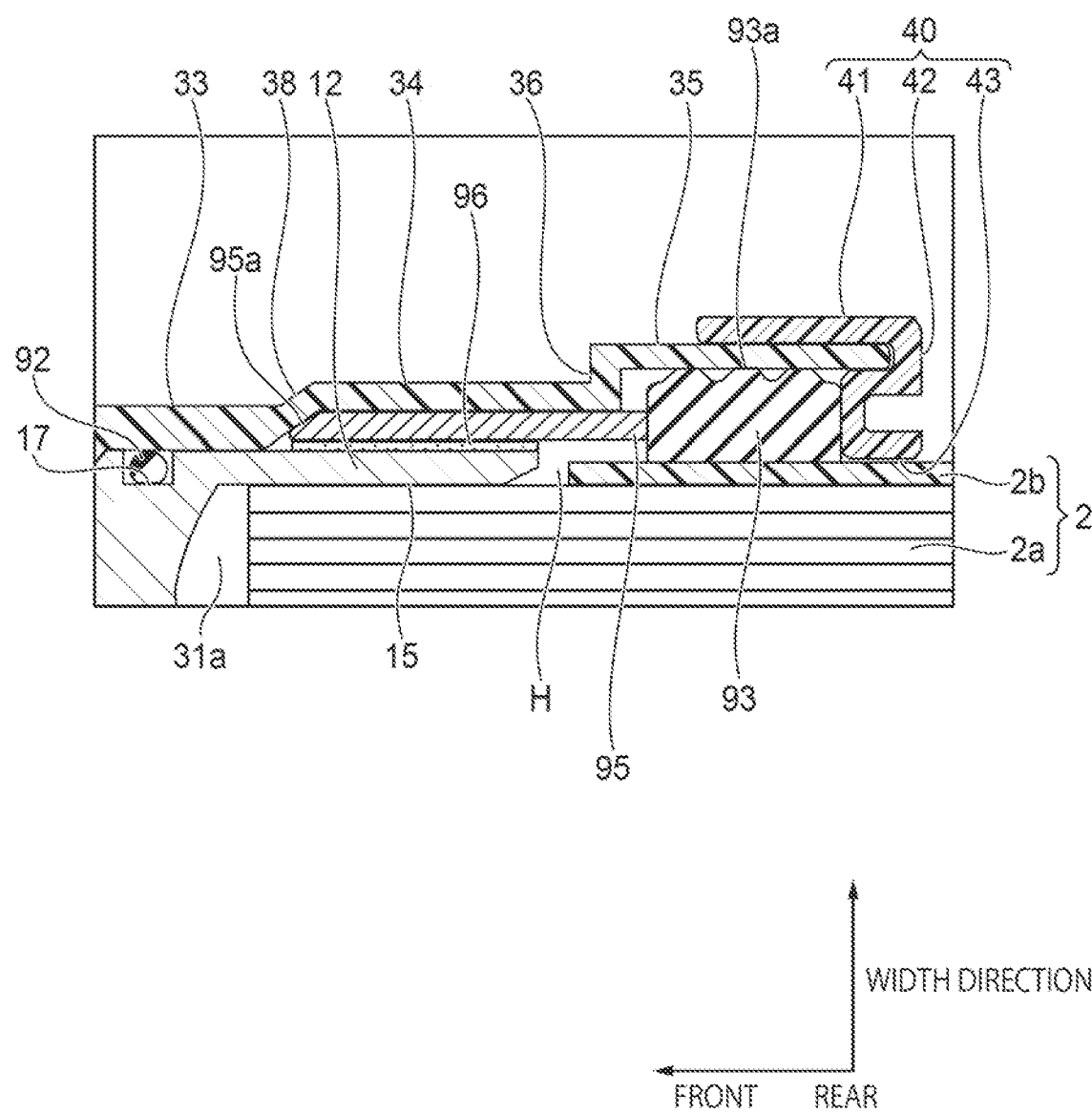
FIG. 19 is a view corresponding to FIG. 7 in the eighth embodiment and the ninth embodiment (the heat sink is not shown).

In the sixth embodiment described above, the cylindrical member formed by the metal mesh is used as the heat transfer member 96 (see FIGS. 15 and 16). In contrast, in the connector 1 according to an eighth embodiment of the present invention, as shown in FIG. 18, a sheet-shaped member formed of a nonwoven fabric coated with metal plating such as copper plating is used as the heat transfer member 96. As shown in FIG. 19, the sheet-shaped heat transfer member 96 shown in FIG. 18 is wound around the outer peripheral surface of the large diameter portion 12 of the terminal 10, and is fixed to the outer peripheral surface of the large diameter portion 12 by a method such as crimping or laser joining.

In the eighth embodiment, the terminal 10 in which the heat transfer member 96 shown in FIG. 18 is wound around and fixed to the outer peripheral surface of the large diameter portion 12 is housed in the base holder 30, and then the heat storage member 95 used in the first embodiment is housed in the base holder 30 (the medium diameter portion 34). Accordingly, as shown in FIG. 19, the heat storage member 95 is located in the gaps between the outer peripheral surface of the heat transfer member 96 and the inner peripheral surface of the medium diameter portion 34 of the terminal holding portion 31 shown in FIG. 18, and at least the inner peripheral surface of the heat storage member 95 is in close contact with the outer peripheral surface of the heat transfer member 96.

In the eighth embodiment, since the flexible heat transfer member 96 formed of a nonwoven fabric covered with metal plating can be easily deformed into a shape corresponding to the gaps H, the heat transfer member 96, the connection portion (large diameter portion 12) between the electric wire 2 and the terminal 10, and the heat storage member 95 can be sufficiently brought into close contact with each other. Therefore, the heat absorption from the connection portion (the large diameter portion 12) between the electric wire 2 and the terminal 10 and the heat dissipation to the outside can be performed more efficiently.

Further, in the eighth embodiment, the heat transfer member 96 is formed by a sheet-shaped member coated with a covering material (metal plating) having the heat transfer property. The nonwoven fabric has many minute irregularities on peripheries of many holes opened on a surface thereof. The metal plating comes into contact with the connection portion between the electric wire 2 and the terminal 10 and the heat storage member 95 at these many uneven portions. Therefore, the heat absorption from the connection portion between the electric wire 2 and the terminal 10 and the heat dissipation to the outside can be performed more efficiently.

Ninth Embodiment

In the eighth embodiment described above, a sheet-shaped member formed of a nonwoven fabric covered with metal plating such as copper plating is used as the heat transfer member 96, (see FIG. 18). In contrast, in the connector 1 according to a ninth embodiment of the present invention, a sheet-shaped member formed of a nonwoven fabric impregnated with an impregnation material capable of heat storage, such as paraffin, is used as the heat transfer member 96. A shape and an arrangement of the heat transfer member 96 are the same as those of the eighth embodiment (see FIGS. 18 and 19). That is, the sheet-shaped heat transfer member 96 used in the ninth embodiment has a shape shown in FIG. 18, and is wound around the outer peripheral surface of the large diameter portion 12 of the terminal 10 and fixed to the outer peripheral surface of the large diameter portion 12 by a method such as crimping or laser joining as shown in FIG. 19.

In the ninth embodiment, the terminal 10 in which the heat transfer member 96 shown in FIG. 18 is wound around and fixed to the outer peripheral surface of the large diameter portion 12 is housed in the base holder 30, and then the heat storage member 95 used in the first embodiment is housed in the base holder 30 (the medium diameter portion 34). Accordingly, as shown in FIG. 19, the heat storage member 95 is located in the gaps between the outer peripheral surface of the heat transfer member 96 and the inner peripheral surface of the medium diameter portion 34 of the terminal holding portion 31 shown in FIG. 18, and at least the inner peripheral surface of the heat storage member 95 is in close contact with the outer peripheral surface of the heat transfer member 96.

In the ninth embodiment, since the flexible heat transfer member 96 formed of a nonwoven fabric impregnated with the impregnation material capable of heat storage can be easily deformed into a shape corresponding to the gaps H, the heat transfer member 96, the connection portion (large diameter portion 12) between the electric wire 2 and the terminal 10, and the heat storage member 95 can be sufficiently brought into close contact with each other. Therefore, the heat absorption from the connection portion (the large diameter portion 12) between the electric wire 2 and the terminal 10 and the heat dissipation to the outside can be performed more efficiently.

Further, in the ninth embodiment, by a heat storage effect of the impregnation material, the heat transfer member 96 can exert the heat storage effect for assisting the heat storage member 95 in addition to the heat absorption from the connection portion (large diameter portion 12) and the heat dissipation to the outside. Further, since the nonwoven fabric has flexibility enough to follow the surface shape of the connection portion (large diameter portion 12) and the heat storage member 95, adhesion to the connection portion (large diameter portion 12) and the heat storage member 95 can be improved. By using the impregnation material capable of latent heat storage, such as paraffin, fluidity of the impregnation material increases with phase transition at a time of the heat storage, and therefore the adhesion of the heat transfer member 96 to the connection portion (large diameter portion 12) and the heat storage member 95 can be improved.

Tenth Embodiment

Figure 20:
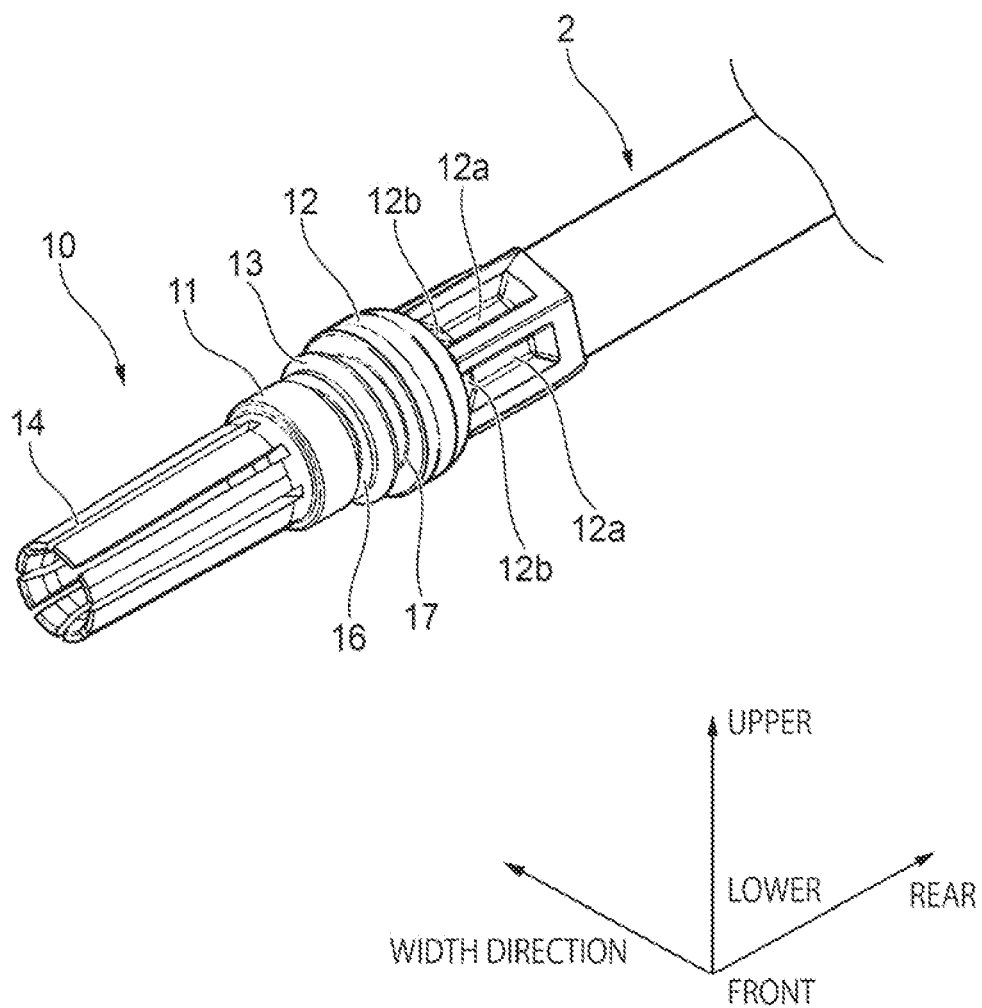
FIG. 20 is a perspective view showing the terminal, which is used in a tenth embodiment, to which the electric wire is connected.

In the connector 1 according to a tenth embodiment of the present invention, as shown in FIG. 20, recessed crimp traces 12a formed when the electric wire 2 and the terminal 10 are crimped and fixed are formed on the outer peripheral surface of the large diameter portion 12 of the terminal 10 at a plurality of positions (six positions) in the circumferential direction. An inner wall surface defining a front end of the recessed crimp trace 12a is an inclined surface 12b that is inclined in a direction in which the inner wall surface moves forward as the inner wall surface extends outward in the radial direction (see FIGS. 20 to 22).

Figure 21:
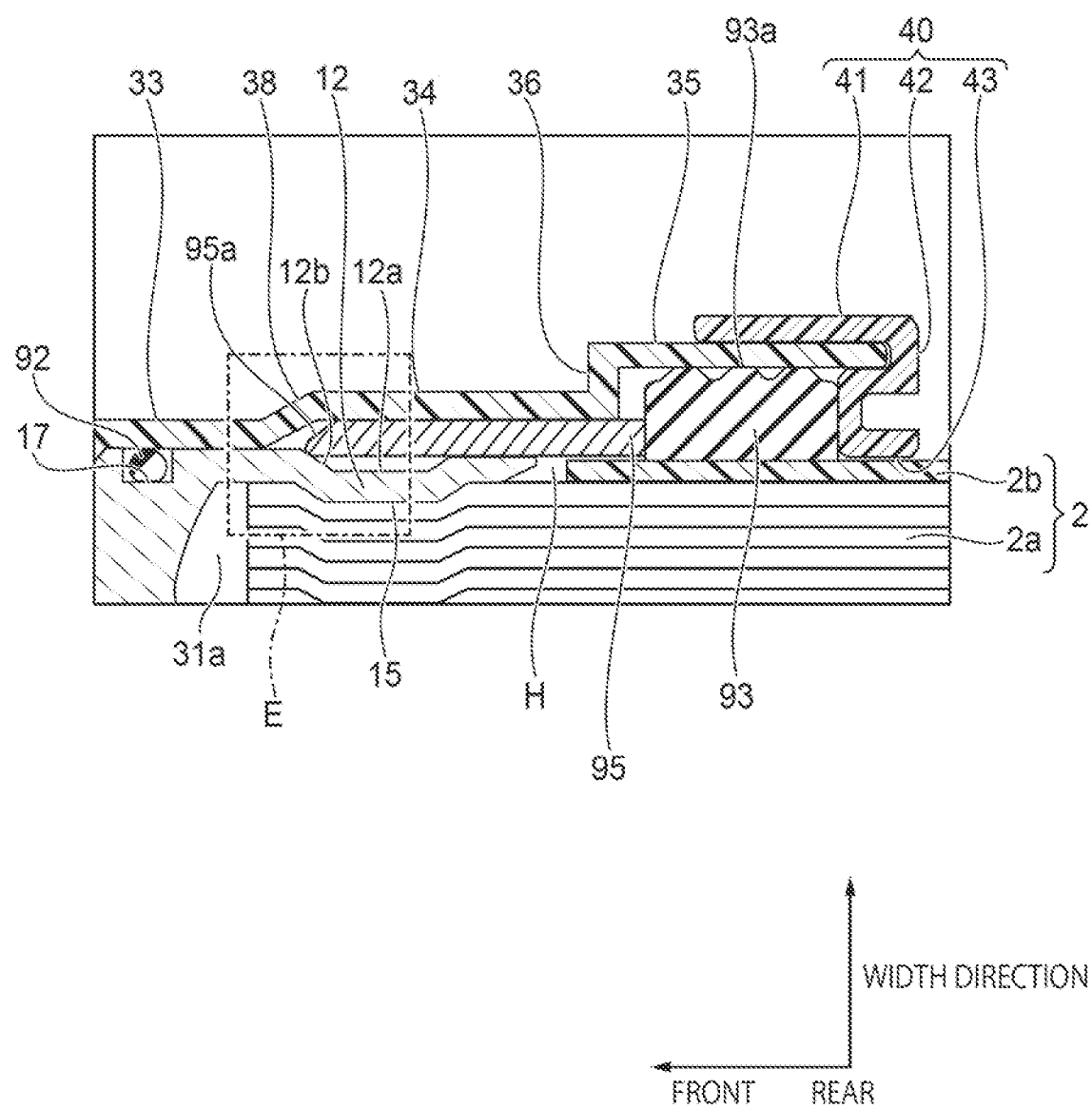
FIG. 21 is a view corresponding to FIG. 7 in the tenth embodiment (the heat sink is not shown).
Figure 22:
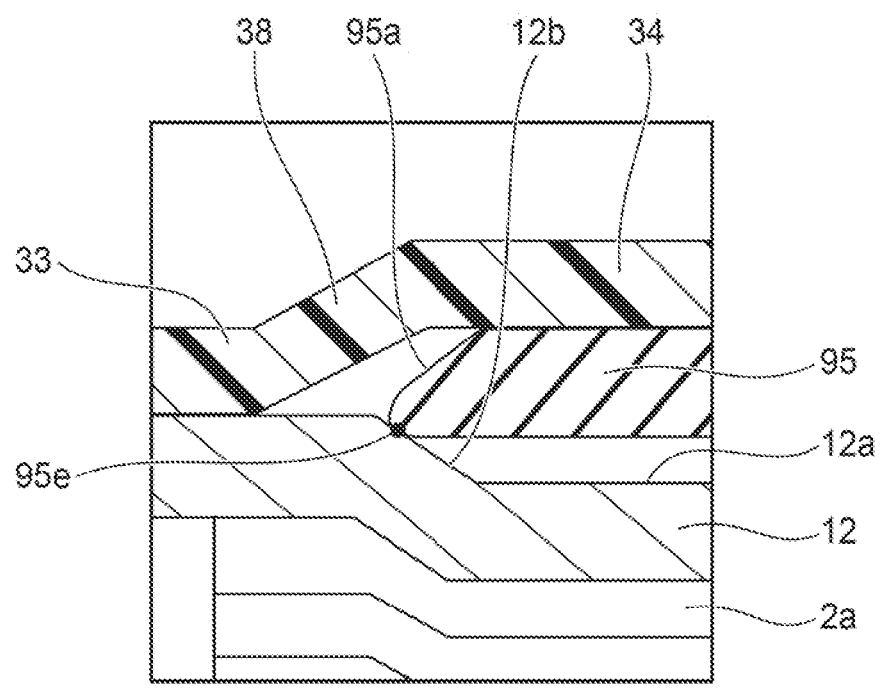
FIG. 22 is an enlarged view of an E portion of FIG. 21.
Figure 22:
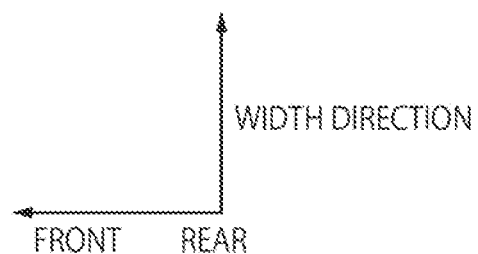

In the tenth embodiment, the terminal 10 to which the electric wire 2 is crimped and fixed is housed in the base holder 30, and then the heat storage member 95 used in the first embodiment is housed in the base holder 30 (the medium diameter portion 34). At this time, as shown in FIGS. 21 and 22, an annular distal end 95e (see FIG. 22) of the heat storage member 95 is pressed against the inclined surface 12b of the terminal 10, whereby the annular distal end 95e of the heat storage member 95 comes into line contact (or point contact) with the inclined surface 12b, and a distal end portion of the heat storage member 95 is press-fitted between the inclined surface 12b and the inner peripheral surface of the medium diameter portion 34 of the base holder 30. In the tenth embodiment, the heat transfer member 96 is omitted.

In the tenth embodiment, the heat storage member 95 is press-fitted between the inner wall surface of the medium diameter portion 34 of the base holder 30 defining the internal space 31a and the inclined surface 12b of the recessed crimp trace 12a of the terminal 10. Accordingly, the adhesion between the heat storage member 95 and the base holder 30 and the adhesion between the heat storage member 95 and the surface of the terminal 10 (that is, the connection portion between the electric wire 2 and the terminal 10) are enhanced, and the heat absorption from the connection portion and the heat dissipation to the outside can be performed more efficiently.

Further, in the tenth embodiment 2, by using the inclined surfaces 12b of the crimp traces 12a of the terminal 10, the heat storage member 95 and the surface of the terminal 10 can be appropriately brought into close contact with each other without providing dedicated press-fit protrusions or the like on the surface of the terminal 10.

Eleventh Embodiment

Figure 23:
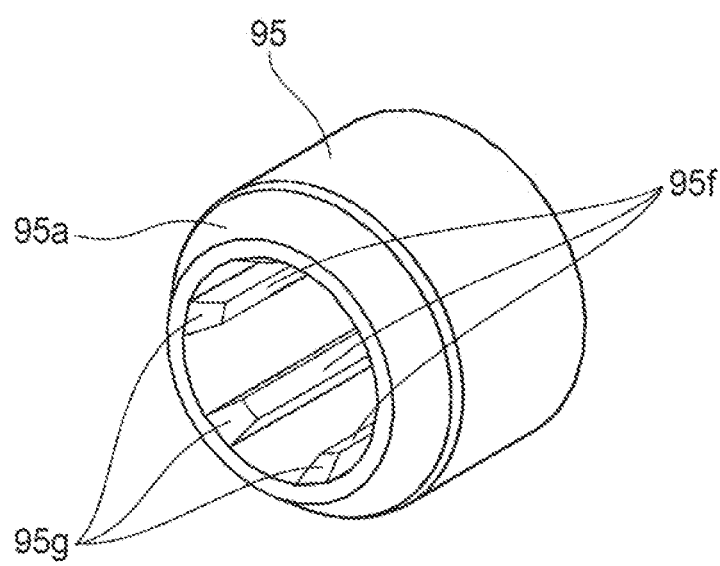
FIG. 23 is a perspective view showing the heat storage member used in an eleventh embodiment.
Figure 23:
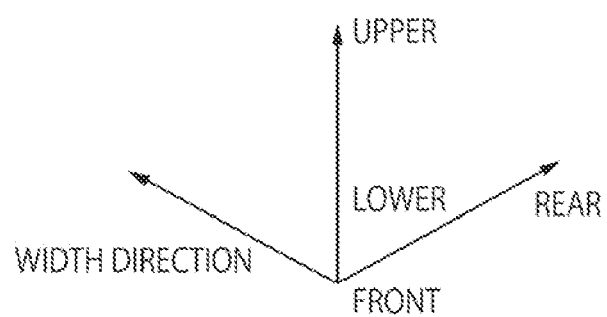

In the connector 1 according to an eleventh embodiment of the present invention, the terminal 10 shown in FIG. 20 is used as in the tenth embodiment. Further, in the eleventh embodiment, as shown in FIG. 23, projections 95f protruding inward in the radial direction and extending in the front-rear direction are provided on the inner peripheral surface of the cylindrical heat storage member 95 at a plurality of positions (six positions) in the circumferential direction corresponding to the plurality of (six) crimp traces 12a of the large diameter portion 12 of the terminal 10. That is, the heat storage member 95 has the same number of projections 95f as the crimp traces 12a of the terminal 10. The front end surface of each of the projections 95f is an inclined surface 95g that is inclined in a direction in which the front end surface moves forward as the front end surface extends outward in the radial direction (see FIGS. 23 and 25).

Figure 24:
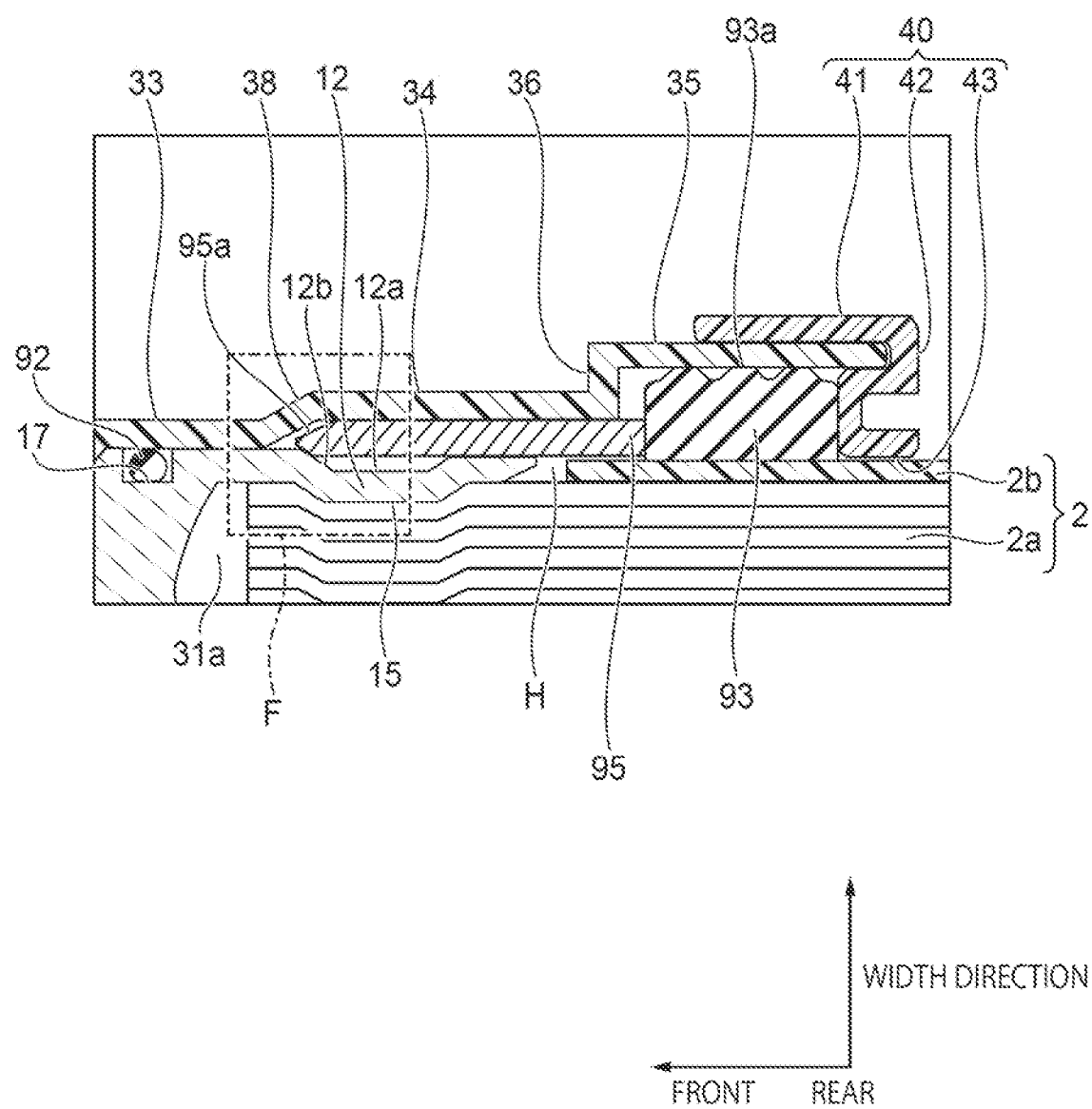
FIG. 24 is a view corresponding to FIG. 7 in the eleventh embodiment (the heat sink is not shown).
Figure 25:
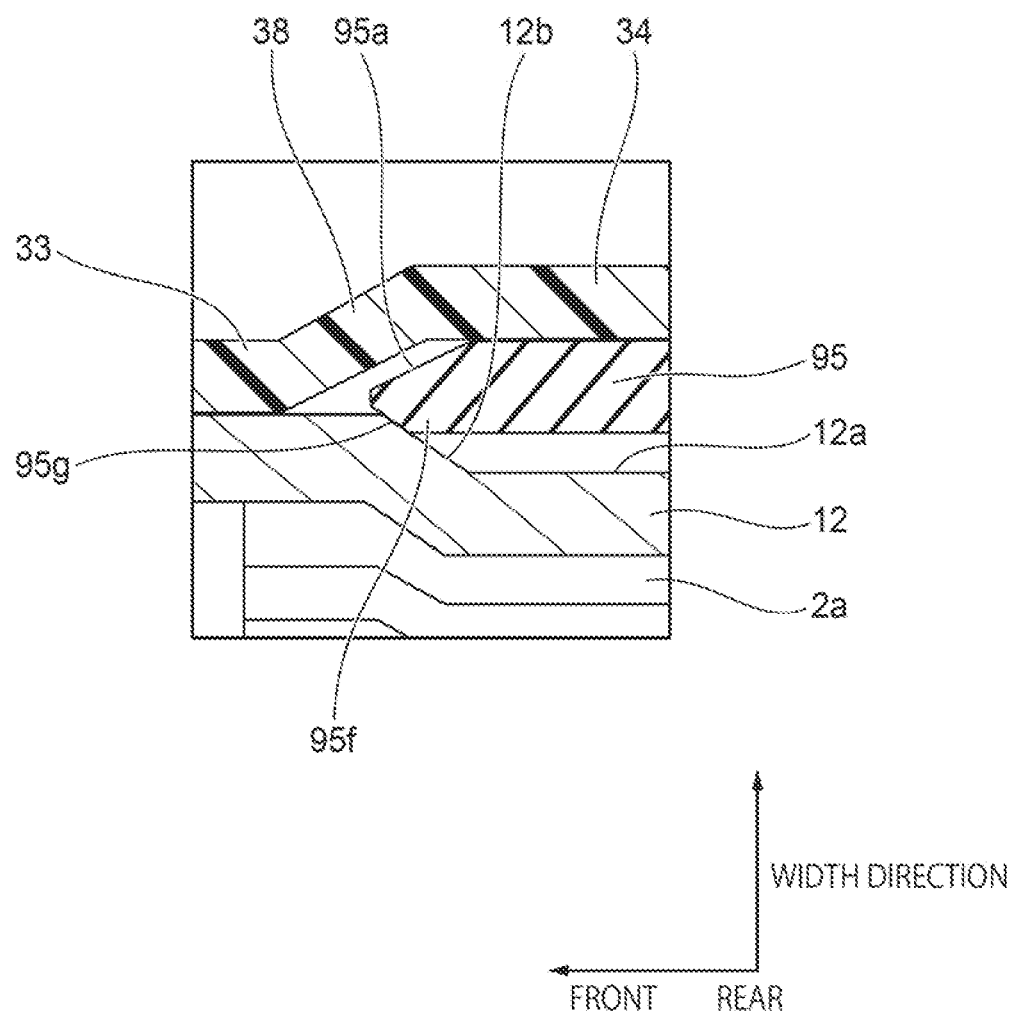
FIG. 25 is an enlarged view of an F portion of FIG. 24.

In the eleventh embodiment, the terminal 10 to which the electric wire 2 is crimped and fixed is housed in the base holder 30, and thereafter, the heat storage member 95 shown in FIG. 23 is housed in the base holder 30 (the medium diameter portion 34). At this time, as shown in FIGS. 24 and 25, the inclined surface 95g (see FIG. 25) of each of the projections 95f of the heat storage member 95 is pressed against the inclined surface 12b of the terminal 10, whereby the inclined surface 95g of each of the projections 95f of the heat storage member 95 comes into surface contact with the inclined surface 12b, and the distal end portion of the heat storage member 95 is press-fitted between the inclined surface 12b and the inner peripheral surface of the medium diameter portion 34 of the base holder 30. In the eleventh embodiment, the heat transfer member 96 is omitted as in the tenth embodiment.

According to the eleventh embodiment, the heat storage member 95 is press-fitted between the inner wall surface of the medium diameter portion 34 of the base holder 30 defining the internal space 31a and the inclined surface 12b of the recessed crimp trace 12a of the terminal 10. Accordingly, the adhesion between the heat storage member 95 and the base holder 30 and the adhesion between the heat storage member 95 and the surface of the terminal 10 (that is, the connection portion between the electric wire 2 and the terminal 10) are enhanced, and the heat absorption from the connection portion and the heat dissipation to the outside can be performed more efficiently.

According to the eleventh embodiment, the inclined surface 12b of the crimp trace 12a of the terminal 10 and the inclined surface 95g of the projection 95f of the heat storage member 95 are brought into surface contact with each other, whereby the heat storage member 95 and the surface of the terminal 10 can be more appropriately brought into close contact with each other.

Further, according to the eleventh embodiment, since the heat storage member 95 has the same number of projections 95f as the crimp traces 12a, the number of portions at which the inclined surface 12b of the crimp trace 12a and the inclined surface 95g of the projection 95f of the heat storage member 95 are in surface contact with each other can be increased without an excessive design burden.

Twelfth Embodiment

Figure 26:
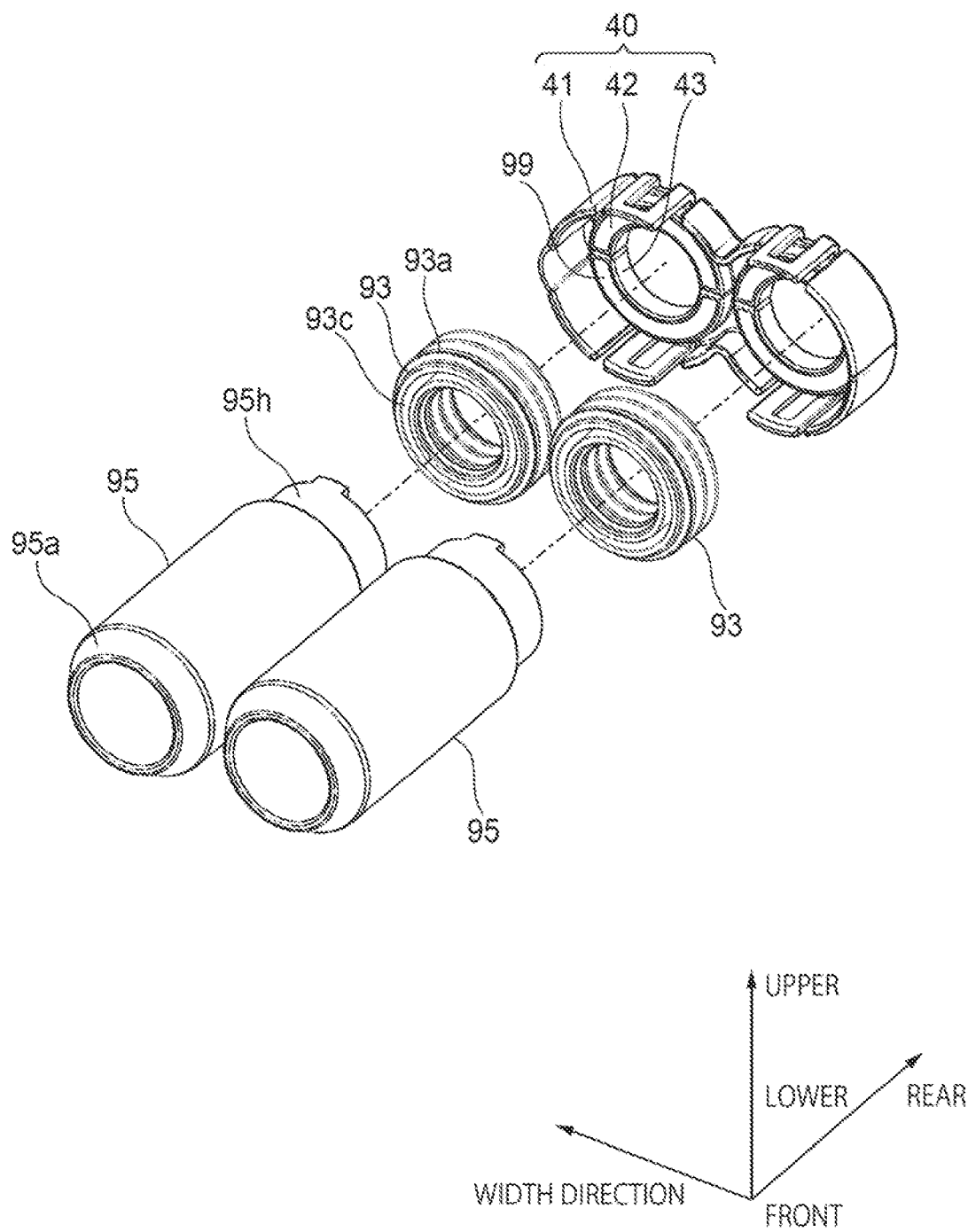
FIG. 26 is a perspective view showing the heat storage member, a packing, and the rear holder used in a twelfth embodiment.
Figure 27:
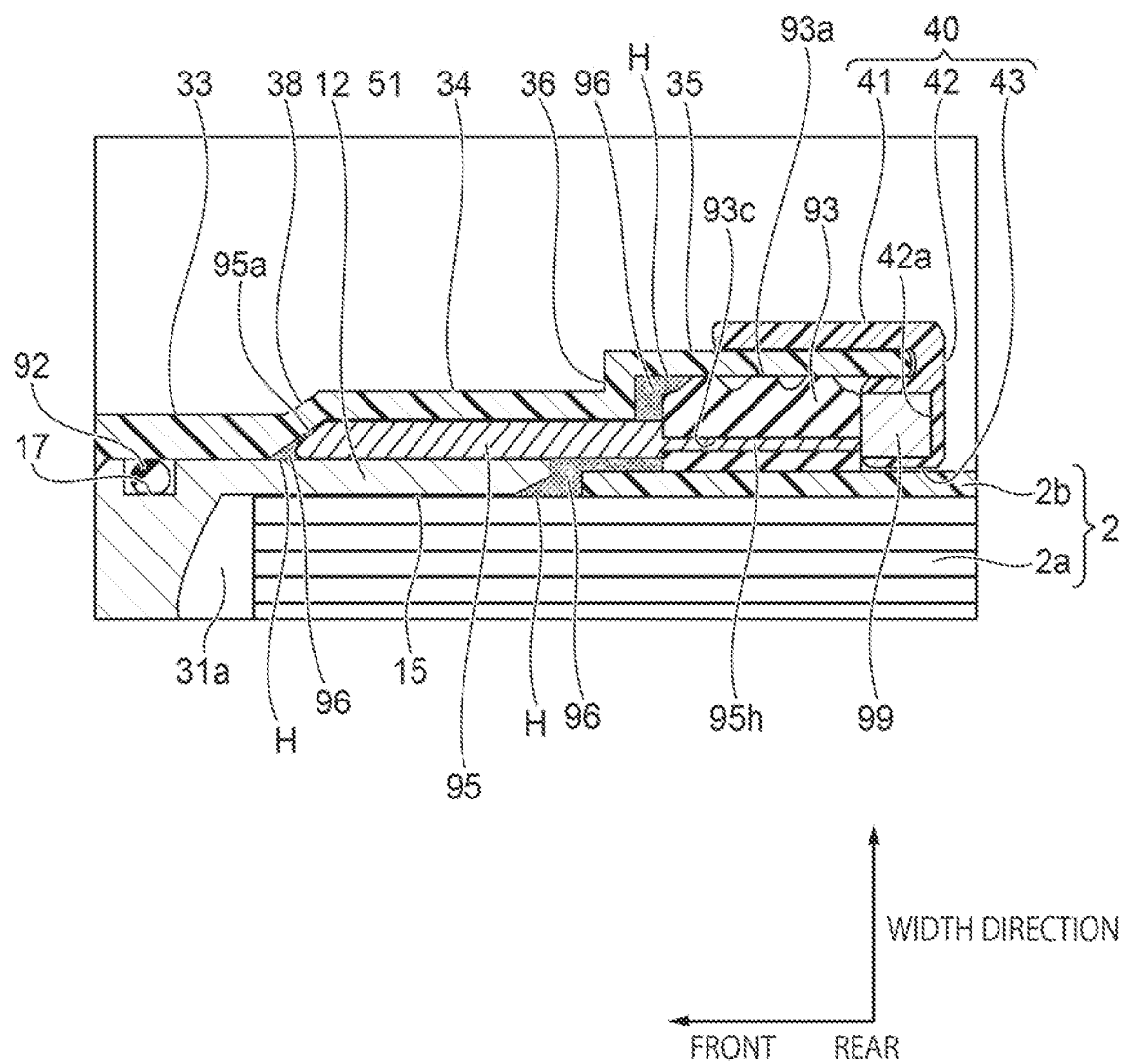
FIG. 27 is a view corresponding to FIG. 7 in the twelfth embodiment (the heat sink is not shown).

In the connector 1 according to a twelfth embodiment of the present invention, as shown in FIGS. 26 and 27, an arc-shaped gap 93c penetrating in the front-rear direction is formed inside the cylindrical packing 93, and an extending portion 95h extending further rearward is formed on the rear end surface of the cylindrical heat storage member 95 corresponding to the gap 93c of the packing 93. On a front end surface of the rear wall portion 42 of the rear holder 40, a recess 42a recessed rearward and extending in an arc shape is formed corresponding to the gap 93c of the packing 93 (see FIG. 27), and a heat storage portion 99 capable of heat storage is housed in the recess 42a. The heat storage portion 99 is made of, for example, a metal material capable of sensible heat storage. The extending portion 95h of the heat storage member 95 penetrates through the gap 93c of the packing 93 and is in contact with a front end surface of the heat storage portion 99 housed in the recess 42a of the rear wall portion 42 of the rear holder 40.

According to the twelfth embodiment, the extending portion 95h of the heat storage member 95 penetrates through the packing 93 and is in contact with the heat storage portion 99 housed in the rear holder 40. Accordingly, in addition to the heat storage member 95, the heat storage portion 99 housed in the rear holder 40 can be used for the heat storage. Therefore, the heat absorption from the connection portion between the electric wire 2 and the terminal 10 and the heat dissipation to the outside can be performed more efficiently.

As described above, according to the connector 1 according to the first to twelfth embodiments, the connection portion between the electric wire 2 and the terminal 10 and the heat storage member 95 are housed in the internal space 31a of the terminal holding portion 31 in the housing 20. In other words, the heat storage member 95 is disposed so as to reduce sizes of the gaps H (see FIG. 7) around the connection portion in the internal space 31a. Accordingly, by absorbing the heat generated at the connection portion between the electric wire 2 and the terminal 10 at the time of energization by the heat storage member 95 having the large heat capacity, even when the amount of heat generated at the connection portion per unit time is large as at a time of fast charging, it is possible to prevent a rapid increase in an operating temperature of the terminal 10 and to moderately increase the operating temperature of the terminal 10. Therefore, the connector 1 according to the first embodiment to the twelfth embodiment can prevent an excessive rise in the operating temperature of the terminal 10 while avoiding an increase in a size of the connector 1.

Further, the heat transfer member 96 is disposed in the internal space 31a so as to fill the gaps H (FIG. 7) remaining around the heat storage member 95. Accordingly, the heat transfer (that is, the heat absorption from the connection portion) from the connection portion between the electric wire 2 and the terminal 10 to the heat storage member 95 and the heat transfer (that is, heat dissipation to the outside) from the heat storage member 95 to the housing 20 can be performed more efficiently.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

For example, a plurality of features of the heat storage member 95 and the heat transfer member 96 in the connector 1 according to the first embodiment to the twelfth embodiment described above may be appropriately combined. Specifically, for example, in the sixth and seventh embodiments (see FIGS. 16 and 17), the cylindrical member formed by the metal mesh shown in FIG. 15 is used as the heat transfer member 96. In contrast, as the heat transfer member 96, in addition to the cylindrical member formed by the metal mesh shown in FIG. 15, a member, which is used in the first embodiment, having fluidity in which a substance for promoting heat transfer, such as alumina particles, is mixed into a base material having fluidity and viscosity, such as a grease or a silicone paste, may be disposed so as to fill the gaps H.

Similarly, in the eighth embodiment and the ninth embodiment (see FIGS. 18 and 19), the sheet-shaped member shown in FIG. 18 is used as the heat transfer member 96. In contrast, as the heat transfer member 96, in addition to the sheet-shaped member shown in FIG. 18, a member, which is used in the first embodiment, having fluidity in which a substance for promoting heat transfer, such as alumina particles, is mixed into a base material having fluidity and viscosity, such as a grease or a silicone paste may be disposed so as to fill the gaps H.

In the tenth and eleventh embodiments (see FIGS. 21 and 24), the heat transfer member 96 is omitted. In contrast, as the heat transfer member 96, a member, which is used in the first embodiment, having fluidity in which a substance for promoting heat transfer, such as alumina particles, is mixed into a base material having fluidity and viscosity, such as a grease or a silicone paste may be disposed so as to fill the gaps H.

Further, in the modification of the fifth embodiment, the rear end portions 34c of the projections 34b provided on the inner peripheral surface of the base holder 30 are brought into contact with the packing 93 (see FIG. 14). In the other embodiments, similarly, the projections 34b may be provided on the inner peripheral surface of the base holder 30, and the rear end portions 34c of the projections 34b may be brought into contact with the packing 93. In addition, in any of the embodiments, the packing 93 may be disposed so as not to come into contact with the projections 34b and also not to come into contact with the heat storage member 95.

According to the above exemplary embodiments, the connector (1) comprises:

an electric wire (2);

a terminal (10) connected to the electric wire (2);

a housing (20) having a housing space (31a) to house a connection portion of the electric wire (2) and the terminal (10);

a seal member (93) to seal an opening portion of the housing space (31a) to isolate the connection portion housed in the housing space (31a) from an outside; and a heat storage member (95) located in the housing space (31a).

According to the connector having the configuration described above, the connection portion between the electric wire and the terminal and the heat storage member are housed in the housing space in the housing. In other words, the heat storage member is disposed so as to reduce sizes of the gaps around the connection portion in the housing space. Accordingly, by absorbing heat generated at the connection portion between the electric wire and the terminal at a time of energization by the heat storage member having a large heat capacity, even when an amount of heat generated at the connection portion per unit time is large as at a time of fast charging, it is possible to prevent a rapid increase in an operating temperature of the terminal and to moderately increase the operating temperature of the terminal. From a viewpoint of the heat absorption from the connection portion, it is preferable that at least a part of the heat storage member is in contact with the connection portion. Further, since the heat storage member is present in the housing space, an amount of air in the housing space functioning as a heat insulating material can be reduced. Therefore, the connector having the present configuration can prevent an excessive rise in the operating temperature of the terminal while avoiding the increase in the size of the connector.

The connector (1) may further comprises:

a heat transfer member (96) located in the housing space (31a) to fill at least a part of a gap (H) remaining around the heat storage member (95) in the housing space (31a).

According to the connector having the configuration described above, the heat transfer member is disposed in the housing space so as to fill at least a part of the gap remaining around the heat storage member. Accordingly, for example, when the heat transfer member is disposed between the heat storage member and the connection portion between the electric wire and the terminal, the heat transfer (that is, the heat absorption from the connection portion) from the connection portion to the heat storage member can be performed more efficiently. Further, for example, when the heat transfer member is disposed between the heat storage member and the housing, the heat transfer (that is, the heat dissipation to the outside) from the heat storage member to the housing can be performed more efficiently.

In the connector (1), the heat transfer member (96) may include: a flexible base material; and a heat transfer body having a heat transfer property and is mixed with the base material.

According to the connector having the configuration described above, the heat transfer member includes a mixture of the flexible base material (for example, a grease or silicone) and the heat transfer body (for example, alumina particles). When the mixture is deformed into a shape corresponding to the gap remaining around the heat storage member, the connection portion, the heat storage member, and the heat transfer member can be easily brought into close contact with each other. Therefore, the heat absorption from the connection portion and the heat dissipation to the outside can be performed more efficiently.

In the connector (1), the heat transfer member (96) may have a mesh material formed of a wire material having the heat transfer property.

According to the connector having the configuration described above, the heat transfer member is formed by the mesh material formed of the wire material (for example, a metal wire) having the heat transfer property. The mesh material has many minute irregularities on a surface thereof because the metal mesh has a portion at which the wire materials intersect with each other, a portion at which the wire materials are woven with each other, or the like. The mesh material comes into contact with the connection portion between the electric wire and the terminal and the heat storage member at these many uneven portions. Therefore, the heat absorption from the connection portion and the heat dissipation to the outside can be performed more efficiently. Further, even when an external force such as a vibration is applied to the connector, the mesh material is prevented from being pushed out (so-called pump-out) from the gap around the heat storage member.

In the connector (1), the mesh material may have conductivity, and the heat transfer member (96) may be located in the gap (H), and the heat transfer member (96) may be located between the electric wire (2) and the terminal (10).

According to the connector having the configuration described above, the conductive mesh material is disposed between the electric wire and the terminal in addition to the gap between the connection portion between the electric wire and the terminal and the heat storage member. Accordingly, it is possible to improve efficiencies of the heat absorption from the connection portion and the heat dissipation to the outside, and it is also possible to improve reliability of the electrical connection between the electric wire and the terminal.

In the connector (1), the heat transfer member (96) may have: a porous sheet material; and a covering material having the heat transfer property and covering the porous sheet material.

According to the connector having the configuration described above, the heat transfer member includes the porous sheet material (for example, nonwoven fabric) coated with the covering material (for example, copper plating) having the heat transfer property. The sheet material has many minute irregularities on peripheries of many holes opened on a surface thereof. The covering material covering the sheet material comes into contact with the connection portion between the electric wire and the terminal and the heat storage member at these many uneven portions. Therefore, the heat absorption from the connection portion and the heat dissipation to the outside can be performed more efficiently. Furthermore, if the sheet material that is flexible to such the extent that the sheet material can follow the surface shapes of the connection portion and the heat storage member is used, the adhesion to the connection portion and the heat storage member can be improved.

In the connector (1), the heat transfer member (96) may have: a porous sheet material; and an impregnation material capable of heat storage and is impregnated in the sheet material.

According to the connector having the configuration described above, the heat transfer member includes the porous sheet material (for example, a nonwoven fabric) impregnated with the impregnation material (for example, paraffin) capable of the heat storage. The sheet material can hold the impregnation material in a large number of holes. By a heat storage effect of the impregnation material, the heat transfer member can exert the heat storage effect for assisting the heat storage member in addition to the heat absorption from the connection portion and the heat dissipation to the outside. Furthermore, if the sheet material that is flexible to such the extent that the sheet material can follow the surface shapes of the connection portion and the heat storage member is used, the adhesion to the connection portion and the heat storage member can be improved. By using the impregnation material capable of the latent heat storage, the fluidity of the impregnation material increases with phase transition at a time of the heat storage, and therefore the adhesion of the heat transfer member to the connection portion and the heat storage member can be improved.

In the connector (1), the heat storage member (95) may have: a case portion (95) capable of sensible heat storage and being at least partially in contact with the connection portion; and a sealing portion (97) capable of latent heat storage and sealed inside the case portion (95).

According to the connector having the configuration described above, the heat storage member includes the case portion capable of the sensible heat storage and the sealing portion capable of the latent heat storage and sealed inside the case portion. That is, in the case portion, a temperature of the case portion itself changes in accordance with a heat capacity of a material constituting the case portion, whereby thermal energy is stored (that is, sensible heat storage is performed). Meanwhile, in the sealing portion, phase transition of a material constituting the sealing portion is utilized, and transition heat is stored as the thermal energy (that is, the latent heat storage is performed). In this way, by using the case portion and the sealing portion having different heat storage principles in combination, the heat absorption from the connection portion and the heat dissipation to the outside can be performed more efficiently. For example, a mass ratio between the case portion and the sealing portion may be appropriately set in consideration of a degree (for example, an assumed maximum temperature of the connection portion) of heat generated at the connection portion between the electric wire and the terminal. When a density of the material constituting the sealing portion is smaller than a density of the material constituting the case portion, a weight of the heat storage member can be reduced by replacing a part of the case portion with the sealing portion as in the connector having the present configuration.

In the connector (1), the heat storage member (95) may have a tubular shape surrounding the connection portion, and the seal member (93) may be configured to contact at least a part of at least one of an inner peripheral surface and an outer peripheral surface of the heat storage member (95).

According to the connector having the configuration described above, the seal member is in contact with at least a part of at least one of the inner peripheral surface and the outer peripheral surface of the heat storage member having the tubular shape. Accordingly, the heat can be efficiently transferred from the heat storage member to the seal member, and the seal member can be used for the heat storage in addition to the heat storage member. Therefore, the heat absorption from the connection portion and the heat dissipation to the outside can be performed more efficiently.

In the connector (1), the heat storage member (95) may have a protrusion (95d) protruding toward the housing (20), and the housing (20) may have a recess (34a) receiving the protrusion (95d).

According to the connector having the configuration described above, since the heat storage member has the protrusion, a volume of the heat storage member is increased as compared to a case in which the heat storage member does not have such a protrusion, and a heat storage performance of the heat storage member can be improved. Further, since the protrusion of the heat storage member enters the recess of the housing, a surface area contributing to the heat transfer between the two is increased, and the heat absorption from the connection portion and the heat dissipation to the outside can be performed more efficiently.

In the connector (1), the heat storage member (95) may be press-fitted between an inner wall surface of the housing (20) and a surface of the terminal (10), and the inner wall surface may define the housing space (31a).

According to the connector having the configuration described above, the heat storage member is press-fitted between the inner wall surface of the housing defining the housing space and the surface of the terminal. Accordingly, the adhesion between the heat storage member and the housing and the adhesion between the heat storage member and the surface of the terminal are enhanced, and the heat absorption from the connection portion and the heat dissipation to the outside can be performed more efficiently.

In the connector (1), the terminal (10) may be connected to the electric wire (2) by crimping the terminal (10) to the electric wire (2), and the terminal (10) may have a recess (34a) ed crimp trace (12a) on its surface, and the heat storage member (95) may be press-fitted to be in pressure contact with a recessed surface (12b) of the crimp trace (12a).

According to the connector having the configuration described above, by using the recessed surface of the crimp trace of the terminal, the heat storage member and the surface of the terminal can be appropriately brought into close contact with each other without providing dedicated press-fit protrusions or the like on the surface of the terminal.

In the connector (1), the heat storage member (95) may have a protrusion portion (95f) protruding toward the crimp trace (12a), and the protrusion portion (95f) may be in surface contact with the recessed surface (12b) of the crimp trace (12a).

According to the connector having the configuration described above, the recessed surface of the crimp trace of the terminal and the protrusion portion of the heat storage member are in surface contact with each other, whereby the heat storage member and the surface of the terminal can be more appropriately brought into close contact with each other.

In the connector (1), a number of the protrusion portion (95f) of the heat storage member (95) may be the same as a number of the crimp traces (12a).

According to the connector having the configuration described above, since the heat storage member has the same number of protrusion portions as that of the crimp traces, the number of portions at which the recessed surface of the crimp trace and the protrusion portion of the heat storage member are in surface contact with each other can be increased without an excessive design burden.

The connector (1) may further comprise:

a holder (40) preventing a displacement of the seal member (93), wherein the heat storage member (95) may have an extending portion (95h) penetrating the seal member (93) and contacting the holder (40), and the holder (40) may have a heat storage portion (99) located at a contact portion between the holder (40) and the extending portion (95h), the heat storage portion (99) may be capable of heat storage.

According to the connector having the configuration described above, the extending portion of the heat storage member penetrates the seal member and comes into contact with the heat storage portion of the holder. Accordingly, the heat storage portion of the holder can be used for the heat storage in addition to the heat storage member. Therefore, the heat absorption from the connection portion and the heat dissipation to the outside can be performed more efficiently.

Thus, according to the present invention, it is possible to provide a connector capable of preventing an excessive rise in an operating temperature of a terminal while avoiding an increase in a size of the connector.

What is claimed is:

1. A connector comprising:
an electric wire;
a terminal connected to the electric wire;
a housing having a housing space to house a connection portion of the electric wire and the terminal;
a seal member to seal an opening portion of the housing space to isolate the connection portion housed in the housing space from an outside; and
a heat storage member located in the housing space and press-fitted against an inner wall surface of the housing and a surface of the terminal, and
the inner wall surface defines the housing space.

2. The connector according to claim 1, wherein
the heat storage member has: a case portion capable of sensible heat storage and being at least partially in contact with the connection portion; and a sealing portion capable of latent heat storage and sealed inside the case portion.

3. The connector according to claim 1, wherein
the heat storage member has a tubular shape surrounding the connection portion, and
the seal member is configured to contact at least a part of at least one of an inner peripheral surface and an outer peripheral surface of the heat storage member.

4. The connector according to claim 1, wherein
the heat storage member has a protrusion protruding toward the housing, and
the housing has a recess receiving the protrusion.

5. The connector according to claim 1, further comprising:
a heat transfer member located in the housing space to fill at least a part of a gap remaining around the heat storage member in the housing space.

6. The connector according to claim 5, wherein the heat transfer member includes:
a flexible base material; and a heat transfer body having a heat transfer property and is mixed with the base material.

7. The connector according to claim 5, wherein the heat transfer member has: a porous sheet material; and a covering material having the heat transfer property and covering the porous sheet material.

8. The connector according to claim 5, wherein the heat transfer member has: a porous sheet material; and an impregnation material capable of heat storage and is impregnated in the sheet material.

9. The connector according to claim 5, wherein the heat transfer member has a mesh material formed of a wire material having the heat transfer property.

10. The connector according to claim 9, wherein the mesh material has conductivity, and
the heat transfer member is located in the gap, and the heat transfer member is located between the electric wire and the terminal.

11. The connector according to claim 1, wherein the terminal is connected to the electric wire by crimping the terminal to the electric wire, and the terminal has a recessed crimp trace on its surface, and
the heat storage member is press-fitted to be in pressure contact with a recessed surface of the crimp trace.

12. The connector according to claim 11, wherein the heat storage member has a protrusion portion protruding toward the crimp trace, and
the protrusion portion is in surface contact with the recessed surface of the crimp trace.

13. The connector according to claim 12, wherein a number of the protrusion portions of the heat storage member is the same as a number of the crimp traces.

14. A connector comprising:
an electric wire;
a terminal connected to the electric wire;
a housing having a housing space to house a connection portion of the electric wire and the terminal;
a seal member to seal an opening portion of the housing space to isolate the connection portion housed in the housing space from an outside;
a heat storage member located in the housing space; and
a holder preventing a displacement of the seal member, wherein
the heat storage member has an extending portion penetrating the seal member and contacting the holder, and
the holder has a heat storage portion located at a contact portion between the holder and the extending portion, the heat storage portion is capable of heat storage.

* * * * *